(12) United States Patent
Xia et al.

(10) Patent No.: US 12,717,201 B2
(45) Date of Patent: Aug. 25, 2026

(54) VARIABLE LIGHT TRANSMISSION DEVICE COMPRISING ELECTROPHORETIC MEDIUM HAVING LIGHT REFLECTIVE PIGMENT PARTICLES

(71) Applicant: E INK CORPORATION, Billerica, MA (US)

(72) Inventors: Yu Xia, Acton, MA (US); Dirk Hertel, Quincy, MA (US); Dan Luo, Billerica, MA (US); Stephen J. Telfer, Arlington, MA (US)

(73) Assignee: E Ink Corporation, Billerica, MA (US)

( * ) Notice: Subject to any disclaimer, the term of this patent is extended or adjusted under 35 U.S.C. 154(b) by 333 days.

(21) Appl. No.: 18/396,994

(22) Filed: Dec. 27, 2023

(65) Prior Publication Data

US 2024/0219798 A1 Jul. 4, 2024

Related U.S. Application Data

(60) Provisional application No. 63/436,119, filed on Dec. 30, 2022.

(51) Int. Cl.

| | |
|---|---|
| ***G02F 1/167*** | (2019.01) |
| ***G02F 1/16757*** | (2019.01) |
| ***G02F 1/1676*** | (2019.01) |
| ***G02F 1/1677*** | (2019.01) |
| ***G02F 1/1681*** | (2019.01) |
| ***G02F 1/1685*** | (2019.01) |

(52) U.S. Cl.

CPC .......... *G02F 1/167* (2013.01); *G02F 1/16757* (2019.01); *G02F 1/1676* (2019.01); *G02F 1/1677* (2019.01); *G02F 1/1681* (2019.01); *G02F 1/1685* (2019.01)

(58) Field of Classification Search

CPC .. G02F 1/167; G02F 1/16757; G02F 1/16755; G02F 1/16756; G02F 1/1676; G02F 1/16766; G02F 1/1677; G02F 1/1685; G02F 1/1681; G02F 1/1679; G02F 1/1339; G02F 1/1368; G02F 1/13394; G02F 1/13392; G02F 1/13306; G02F 1/13396; G02F 2203/01

USPC .... 359/290–292, 295, 296, 298; 345/24, 84, 345/107

See application file for complete search history.

(56) References Cited

U.S. PATENT DOCUMENTS 4,418,346 A 11/1983 Batchelder
5,872,552 A 2/1999 Gordon, II et al.
(Continued)

FOREIGN PATENT DOCUMENTS

JP 2012016956 A 1/2012

OTHER PUBLICATIONS

European Patent Office, “International Search Report and Written Opinion”, PCT/US2023/085977, Apr. 27, 2024.
(Continued)

*Primary Examiner* — Jie Lei
(74) *Attorney, Agent, or Firm* — Rajesh Vallabh

(57) ABSTRACT

A variable light transmission device is disclosed and a method of manufacture of the same. The variable light transmission device comprises two light transmissive electrodes and a microcell layer having a plurality of microcells, each microcell comprising a protrusion structure and a channel, and including an electrophoretic medium. The opacity of the device is controlled by an applied electric field.

20 Claims, 18 Drawing Sheets

(56) References Cited

U.S. PATENT DOCUMENTS 6,130,774 A 10/2000 Albert et al.
6,144,361 A 11/2000 Gordon, II
6,172,798 B1 1/2001 Albert et al.
6,184,856 B1 2/2001 Gordon, II
6,225,971 B1 5/2001 Gordon, II
6,241,921 B1 6/2001 Jacobson et al.
6,271,823 B1 8/2001 Gordon, II
6,672,921 B1 1/2004 Liang et al.
6,788,449 B2 9/2004 Liang et al.
6,866,760 B2 3/2005 Paolini, Jr. et al.
6,922,276 B2 7/2005 Zhang et al.
6,982,178 B2 1/2006 LeCain et al.
7,002,728 B2 2/2006 Pullen et al.
7,012,600 B2 3/2006 Zehner et al.
7,072,095 B2 7/2006 Liang et al.
7,075,502 B1 7/2006 Drzaic et al.
7,116,318 B2 10/2006 Amundson et al.
7,116,466 B2 10/2006 Whitesides et al.
7,144,942 B2 12/2006 Zang et al.
7,170,670 B2 1/2007 Webber
7,193,625 B2 3/2007 Danner et al.
7,312,784 B2 12/2007 Baucom et al.
7,327,511 B2 2/2008 Whitesides et al.
7,411,719 B2 8/2008 Paolini, Jr. et al.
7,453,445 B2 11/2008 Amundson
7,535,624 B2 5/2009 Amundson et al.
7,679,814 B2 3/2010 Paolini, Jr. et al.
7,715,088 B2 5/2010 Liang et al.
7,839,564 B2 11/2010 Whitesides et al.
7,999,787 B2 8/2011 Amundson et al.
8,009,348 B2 8/2011 Zehner et al.
8,184,357 B2 5/2012 Yeo et al.
8,576,476 B2 11/2013 Telfer et al.
8,582,196 B2 11/2013 Walls et al.
8,917,439 B2 12/2014 Wang et al.
9,279,906 B2 3/2016 Kang
9,341,916 B2 5/2016 Telfer et al.
9,541,701 B2 1/2017 Thompson et al.
10,067,398 B2 9/2018 O'Keeffe
10,234,742 B2 3/2019 Chan et al.
10,319,314 B2 6/2019 Danner et al.
10,331,005 B2 6/2019 Hertel et al.
10,444,553 B2 10/2019 Laxton
10,809,590 B2 10/2020 Widger et al.
11,143,930 B2 10/2021 Widger et al.
11,520,210 B2 12/2022 O'Keeffe et al.
11,756,494 B2 9/2023 Paykin et al.
11,846,838 B2 12/2023 O'Keeffe
2011/0199671 A1 8/2011 Amundson et al.
2011/0304902 A1* 12/2011 Yeo ......................... G02F 1/167
359/296
2015/0005720 A1 1/2015 Zang et al.
2016/0012710 A1 1/2016 Lu et al.
2017/0351155 A1 12/2017 Paolini, Jr. et al.
2020/0272017 A1 8/2020 Park et al.
2020/0355978 A1 11/2020 Bzowej et al.
2020/0355979 A1 11/2020 Ladavac et al.
2021/0072578 A1* 3/2021 O'Keeffe ............ G02F 1/13394
2023/0100320 A1 3/2023 O'Keeffe et al.

OTHER PUBLICATIONS

Squires, Todd M. et al., "Induced-Charge Electro-Osmosis". J. Fluid Mech., vol. 509, pp. 217-252; (2004). Jan. 1, 2004.

* cited by examiner 200
205
234
233
209
213
215
211b

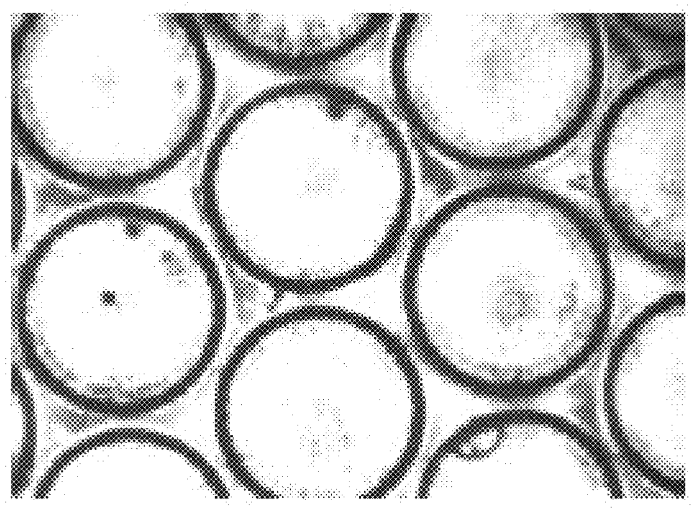
FIG.. 22

VARIABLE LIGHT TRANSMISSION DEVICE COMPRISING ELECTROPHORETIC MEDIUM HAVING LIGHT REFLECTIVE PIGMENT PARTICLES

RELATED APPLICATIONS

This application claims priority to U.S. Provisional Patent Application No. 63/436,119 filed on Dec. 30, 2022, which is incorporated by reference in its entirety, along with all other patents and patent applications disclosed herein.

BACKGROUND OF THE INVENTION

This invention relates to a variable light transmission device and a method of manufacture of the same. Specifically, the invention relates to a microcell electro-optic device comprising an electrophoretic medium, the electrophoretic medium comprising electrically charged pigment particles and a charge control agent. The electrophoretic medium is able to switch between optical states using electric fields. The invention also relates to a method of manufacture of the device. Variable light transmission devices can modulate the amount of light and other electromagnetic radiation passing through them. Variable light transmission devices can be used on mirrors, windows, sunroofs, and similar items. For example, the present invention may be applied on windows that can modulate infrared radiation for controlling temperatures within buildings and vehicles. Specifically, this invention relates to variable light transmission devices that use particle-based electrophoretic media to control light modulation. Examples of electrophoretic media that may be incorporated into various embodiments of the present invention include, for example, the electrophoretic media described in U.S. Pat. Nos. 7,116,466, 7,327,511, 8,576,476, 10,319,314, 10,809,590, 10,067,398, 10,067,398, and 11,143,930, and U.S. Patent Application Publication Nos. 2014/0055841, 2017/0351155, 2017/0235206, 2011/0199671, 2020/0355979, 2020/0272017, 2021/0096439, and U.S. patent application Ser. No. 17/953,386, filed on Sep. 27, 2022 (published as US 2023/0100320), the contents of which are incorporated by reference herein in their entireties.

Particle-based electrophoretic displays, in which a plurality of electrically charged pigment particles move through a suspending fluid under the influence of an electric field, have been the subject of intense research and development for a number of years. Such displays can have attributes of good brightness and contrast, wide viewing angles, state bistability, and low power consumption when compared with liquid crystal displays.

The terms "bistable" and "bistability" are used herein in their conventional meaning in the art to refer to displays comprising display elements having first and second display states differing in at least one optical property, and such that after any given element has been driven by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application Ser. No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

As noted above, electrophoretic media require the presence of a suspending fluid. In most prior art electrophoretic media, this suspending fluid is a liquid, but electrophoretic media can be produced using gaseous suspending fluids. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrically charged pigment particles.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically-mobile particles in a liquid medium, and a capsule wall surrounding the internal phase. Typically, the capsules are themselves held within a polymeric binder to form a coherent layer positioned between two electrodes. In a microcell electrophoretic display, the electrically charged pigment particles and the liquid are not encapsulated within microcapsules but instead are retained within a plurality of cavities formed within a carrier medium, typically a polymeric film. The technologies described in these patents and applications include:

- (a) Electrophoretic particles, fluids and fluid additives; see for example U.S. Pat. Nos. 7,002,728 and 7,679,814.
- (b) Capsules, binders and encapsulation processes; see for example U.S. Pat. Nos. 6,922,276 and 7,411,719.
- (c) Microcell structures, wall materials, and methods of forming microcells; see for example U.S. Pat. Nos. 7,072,095 and 9,279,906.
- (d) Methods for filling and sealing microcells; see for example U.S. Pat. Nos. 7,144,942 and 7,715,088.
- (e) Films and sub-assemblies containing electro-optic materials; see for example U.S. Pat. Nos. 6,982,178 and 7,839,564.
- (f) Backplanes, adhesive layers and other auxiliary layers and methods used in displays; see for example U.S. Pat. Nos. 7,116,318 and 7,535,624.
- (g) Color formation and color adjustment; see for example U.S. Pat. Nos. 7,075,502 and 7,839,564.
- (h) Methods for driving displays; see for example U.S. Pat. Nos. 7,012,600 and 7,453,445.
- (i) Applications of displays; see for example U.S. Pat. Nos. 7,312,784 and 8,009,348.
- (j) Non-electrophoretic displays, as described in U.S. Pat. No. 6,241,921 and U.S. Patent Applications Publication No. 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of a non-polar liquid and a continuous phase of a polymeric material, and that the discrete droplets of electrophoretic medium within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the electrically charged pigment particles and the suspending liquid are not encapsulated within microcapsules but instead are retained within a plurality of cavities formed within a carrier medium, typically a polymeric film. See, for example, International Application Publication No. WO 02/01281, and published U.S. application Ser. No. 2002/0075556, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 6,130,774 and 6,172,798, and 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated or microcell electrophoretic display typically does not suffer from the clustering and settling failure mode of traditional electrophoretic devices and provides further advantages, such as the ability to print or coat the display on a wide variety of flexible and rigid substrates. Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques. Thus, the resulting display can be flexible. Further, because the display medium can be printed (using a variety of methods), the display itself can be made inexpensively.

One potentially important market for electrophoretic media is windows with variable light transmission. As the energy performance of buildings and vehicles becomes increasingly important, electrophoretic media could be used as coatings on windows to enable the proportion of incident radiation transmitted through the windows to be electronically controlled by varying the optical state of the electrophoretic media. Effective implementation of such "variable transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications include of VT technology include privacy glass and glare-guards in electronic devices.

The art provides examples of devices comprising electrophoretic media sandwiched by electrode layers that are able to achieve a closed optical state (opaque state) and an open optical state (transparent state) and to switch between these states by application of electric fields across the electrophoretic medium. However, the open optical state of variable transmission electrophoretic devices using conventional structures are hazy, making the devices less desirable. The inventors of the present invention surprisingly found that devices having a plurality of microcells including a protrusion structure and a light blocking layer show improved performance.

SUMMARY OF THE INVENTION

In one aspect, the present invention provides variable light transmission device comprising two light transmissive electrodes and a microcell layer. The microcell layer comprises a plurality of microcells, each microcell comprising a protrusion structure, a channel, and a light blocking layer, each microcell including an electrophoretic medium with electrically charged pigment particles. The opacity of the device is controlled by an applied electric field.

The inventive variable light transmission devices comprises a first light transmissive electrode layer, a second light transmissive electrode layer, and a microcell layer. The microcell layer comprises a plurality of microcells and a sealing layer. The microcell layer is disposed between the first light transmissive electrode layer and the second light transmissive electrode layer. Each microcell includes an electrophoretic medium, the electrophoretic medium comprising electrically charged pigment particles and a charge control agent in a non-polar liquid. Each microcell of the plurality of microcells has a microcell opening. The sealing layer spans the microcell openings of the plurality of microcells. Each microcell of the plurality of microcells comprises a microcell bottom layer, a protrusion structure, microcell walls, and a channel. The microcell bottom layer has a microcell bottom inside surface, the microcell bottom inside surface comprising an exposed microcell bottom inside surface and an unexposed microcell bottom inside surface. Each microcell of the plurality of microcells comprises a first light blocking layer, the first light blocking layer being in contact with the exposed microcell bottom inside surface and with the electrophoretic medium. The protrusion structure has a protrusion base, a protrusion surface, a protrusion apex, and a protrusion height. The protrusion apex is a point or a set of points of the protrusion structure, the point or the set of points having shorter distance from the microcell opening than all other points of the protrusion structure. The protrusion height is the distance between the protrusion base and the protrusion apex. The protrusion surface is the surface of the protrusion structure not including the protrusion apex that is in contact with the electrophoretic medium. The microcell walls have a microcell inside wall surface and a microcell wall upper surface. The microcell inside wall surface is the surface of the microcell walls of a microcell that is in contact with the electrophoretic medium. The microcell wall upper surface is the surface of the microcell walls of a microcell that is in contact with the sealing layer. The channel has a channel height, the channel height being 50% of the protrusion height. The unexposed microcell bottom inside surface is in contact with the protrusion base. The channel is a volume between the first light blocking layer, the protrusion surface, and the microcell inside wall surface. The charge control agent of the electrophoretic medium of the variable light transmission device may be from 1 weight percent to 8 weight percent by weight of the electrophoretic medium.

Application of a first electric field between the first light transmissive electrode layer and the second light transmissive electrode layer via a first waveform may cause movement of the electrically charged pigment particles towards the channel, resulting in the switching of the variable light transmission device to an open optical state. The electrically charged pigment particles in the open optical state are located inside the channel.

Application of a second electric field between the first light transmissive electrode layer and the second light transmissive electrode layer via a second waveform may cause a movement of the electrically charged pigment particles towards the first light transmissive electrode layer with a velocity, the velocity having a lateral component, leading to a closed optical state. The second waveform may be DC-imbalanced. The second waveform may comprise at least one positive voltage and at least one negative voltage, the second waveform having a net positive or a net negative impulse. The closed optical state has lower percent light transmission than the open optical state.

In one embodiment, the second waveform may comprise an AC waveform, the AC waveform having a frequency, and the AC waveform having a duty cycle of from 5% to 45%. The AC waveform may have a duty cycle higher than 50%, higher than 55%, higher than 60%, or higher than 65%. The AC waveform may have a duty cycle of from 55% to 95%, from 58% to 90%, from 60% to 88%, from 65% to 85%, or from 70% to 80%. The AC waveform may have a duty cycle lower than 50%, lower than 45%, lower than 40%, or lower than 35%. The AC waveform may have a duty cycle of from 5% to 45%, from 8% to 40%, from 10% to 38%, from 10% to 40%, from 15% to 35%, or from 20% to 30%. The AC waveform may be is a square waveform, a sinusoidal waveform, a trigonal waveform, or a sawtooth waveform. The ratio of the frequency of the AC waveform expressed in Hz to the content of the charge control agent in the electrophoretic medium expressed in weight percent of the charge control agent by weight of the electrophoretic medium may be from 400 to 2000 Hz. The AC waveform may be a square waveform having two or more cycles. In this case, the positive and negative voltages of the AC waveform have same amplitude; the amplitude of the AC waveform may be from 10V to 200V; the frequency of the AC waveform may be from 0.1 Hz to 6000 Hz or from 100 Hz to 3000 Hz; the amplitude of the AC waveform may be from 10V to 200V or from 20V to 180V and the frequency of the AC waveform may be from 0.1 Hz to 6000 Hz or form 100 Hz to 3000 Hz. The ratio of the frequency of the AC waveform expressed in Hz to the content of the charge control agent in the electrophoretic medium expressed in weight percent of the charge control agent by weight of the electrophoretic medium may be from 400 to 2000 Hz.

In another embodiment, the second waveform may comprise a waveform that is formed by a superposition of a DC voltage component and an AC waveform, the AC waveform having a frequency and an amplitude. The frequency of the AC waveform may be from 0.1 Hz to 6000 Hz, from 100 Hz to 3000 Hz, or from 400 Hz to 2000 Hz. The amplitude of the AC waveform may be from 10V to 200V or from 20V to 180V. The DC voltage component has an amplitude of from 0.1V to 500V. The ratio of the frequency of the AC waveform expressed in Hz to the content of the charge control agent in the electrophoretic medium expressed in weight percent of the charge control agent by weight of the electrophoretic medium may be from 400 to 2000 Hz. The second waveform may comprise an AC waveform having a DC offset. The AC waveform may be selected from the group consisting of square waveform, sinusoidal waveform, trigonal waveform, and sawtooth waveform.

The protrusion structure may be a geometric solid selected from the group consisting of (a) a cone, (b) a cone on a cylinder, the cylinder having a base, the cylinder's base being the protrusion base of the protrusion structure, (c) a tetrahedron, (d) a tetrahedron on a triangular prism, the triangle prism having a triangle base, the triangle base being the protrusion base of the protrusion structure, (e) a triangular prism, the triangular prism having a square base, the square base being the protrusion base of the protrusion structure, (f) a square pyramid having a square base, the square base being the protrusion base of the protrusion structure, (h) a square pyramid on a cube, the cube having a base, the cube base being the protrusion base of the protrusion structure, (i) a square pyramid on a right parallelepiped, the right parallelepiped having a right parallelogram base, the right parallelogram being the protrusion base of the protrusion structure, (j) a pentagonal pyramid, the pentagonal pyramid having a pentagon base, the pentagon base being the protrusion base of the protrusion structure, (k) a pentagonal pyramid on a pentagonal prism, the pentagonal prism having a pentagon base, the pentagon base being the protrusion base of the protrusion structure, (l) an a hexagonal pyramid, the hexagonal pyramid having an hexagon base, the pentagon base being the protrusion base of the protrusion structure, (m) an hexagonal pyramid on an hexagonal prism, the hexagonal prism having an hexagon base, the hexagon base being the protrusion base of the protrusion structure. The protrusion structure may be a cone, wherein the slope of the cone may be from 5 degrees to 10 degrees. The protrusion structure may be a cone on a cylinder. The cylinder may has a base, the cylinder's base being the protrusion base of the protrusion structure; the cone slope may be 10 degrees or lower. The protrusion structure may be a geometric solid of a pyramid having a base with n sides, the base with n sides being the protrusion base of the protrusion structure, wherein n is an integer from 7 to 12, (m) an pyramid having a base with n sides on a prism having a base with n sides, the base of the prism having n sides being the protrusion base of the protrusion structure, wherein n is from 7 to 12.

The electrophoretic medium may comprise a first type of electrically charged pigment particles and a second type of electrically charged pigment particles. The first type of electrically charged pigment particles may be light reflecting. The second type of electrically charged pigment particles may be light absorbing. The first type of electrically charged pigment particles may be white. The second type of electrically charged pigment particles may be black. The first type of electrically charged pigment particles may have the same polarity as the second type of electrically charged pigment particles. The first type of electrically charged pigment particles may have opposite polarity from the second type of electrically charged pigment particles.

The first light blocking layer may comprise light absorbing pigment particles and a polymer. The light absorbing pigment particles may be electrically charged. The light absorbing pigment particles may be black. The first light blocking layer may comprise light reflecting pigment particles and a polymer. The light reflecting pigment particles may be electrically charged. The light reflecting pigment particles may be white.

The first light blocking layer may be formed by curing of a first light blocking composition; the first light blocking composition may comprise a light absorbing pigment, a polymer, oligomer, or monomer, and optionally, a solvent. The curing of the first light blocking composition may be achieved thermally, by UV irradiation, by solvent evaporation, or by a combination thereof.

The inventive variable light transmission device may comprise a second light blocking layer. The second light blocking layer may be disposed between the microcell wall upper surface and the sealing layer. The second light blocking layer may be conductive. The second light blocking layer may comprise light absorbing pigment particles and a polymer. The second light blocking layer may comprise light reflecting pigment particles and a polymer.

The second light blocking layer may be formed by coating the microcell wall upper surface with a dispersion composition and curing the coated dispersion composition thermally, by UV irradiation, by solvent evaporation, or by a combination thereof. The dispersion composition may comprise a light absorbing pigment, a polymer, oligomer, or monomer, and optionally, a solvent.

The inventive variable light transmission device may further comprising an auxiliary layer, the auxiliary layer being disposed between the second light blocking layer and the sealing layer. The auxiliary layer may be an adhesive layer. The auxiliary layer may comprise light reflecting pigment particles. The auxiliary layer may comprise an encapsulated electrophoretic layer, the encapsulated electrophoretic layer comprising an electrophoretic medium including electrically charged pigment particles; upon application of an electric field across the encapsulated electrophoretic layer of the auxiliary layer, a color or image switching of the auxiliary layer may be achieved.

In another aspect, the present invention provides a method of manufacture of a variable light transmission device. The method comprises the steps of (a) providing an assembly comprising a third electrode layer, a second light transmissive electrode layer, a layer comprising a plurality of microcells, the layer comprising a plurality of microcells being disposed between the third electrode layer and the second light transmissive electrode layer, each microcell of the plurality of microcells including a light blocking composition comprising (i) light absorbing electrically charged pigment particles, (ii) a polymer, oligomer, or monomer and, (iii) optionally, a solvent, each microcell of the plurality of microcells having a microcell opening, the third electrode layer spanning the microcell openings of the plurality of microcells, each microcell of the plurality of microcells comprising a microcell bottom layer, a protrusion structure, microcell walls, and a channel, the microcell bottom layer having a microcell bottom inside surface, the microcell bottom inside surface comprising an exposed microcell bottom inside surface and an unexposed microcell bottom inside surface; (b) applying an electric field between the third electrode layer and the second light transmissive electrode layer via a waveform that causes movement of the light absorbing electrically charged pigment particles of the light blocking composition towards the channel and resulting in a state in which state the light absorbing electrically charged pigment particles are located inside the channel; (c) curing the light blocking composition to form a light blocking layer on the exposed microcell bottom inside surface; (d) removing the third electrode layer; (e) filling each microcell of the plurality of microcells with an electrophoretic medium comprising electrically charged pigment particles, a charge control agent, and a non-polar liquid; (f) sealing each microcell of the plurality of microcells with a sealing layer; and (g) attaching a first light transmissive electrode layer onto the sealing layer. If the light blocking composition comprises a solvent, the solvent is evaporated during the curing of the first dispersion composition. The curing of the light blocking composition may be achieved by UV irradiation, thermally, or by solvent evaporation.

In yet another aspect, the present invention provides a method of manufacture of a variable light transmission device. The method comprises the steps, (a) providing an assembly comprising in order a second light transmissive electrode layer, a second light transmissive electrode layer, a layer comprising a plurality of microcells being disposed on the second light transmissive electrode layer, each microcell of the plurality of microcells having a microcell opening, each microcell of the plurality of microcells comprising a microcell bottom layer, a protrusion structure, microcell walls, and a channel, the microcell bottom layer having a microcell bottom inside surface, the microcell bottom inside surface comprising an exposed microcell bottom inside surface and an unexposed microcell bottom inside surface, the protrusion structure having a protrusion base, a protrusion surface, a protrusion apex, and a protrusion height, the protrusion apex being a point or a set of points of the protrusion structure, the point or the set of points having shorter distance from the microcell opening than all other points of the protrusion structure, the protrusion height being the distance between the protrusion base and the protrusion apex, the protrusion surface being the surface of the protrusion structure not including the protrusion apex and the protrusion base, the microcell walls having a microcell inside wall surface and a microcell wall upper surface, the channel having a channel height, the channel height being 50% of the protrusion height, the unexposed microcell bottom inside surface being in contact with the protrusion base, the channel being a volume between the exposed microcell bottom inside surface, the protrusion surface, and the microcell inside wall surface; (b) dispensing a light blocking composition onto the exposed microcell bottom inside surface of each microcell, the light blocking composition comprising (i) light absorbing pigment particles, (ii) a polymer, oligomer, or monomer, and (iii) optionally, a solvent; (c) curing the light blocking composition to form a light blocking layer on the exposed microcell bottom inside surface; (d) filling each microcell of the plurality of microcells with an electrophoretic medium comprising electrically charged pigment particles, a charge control agent, and a non-polar liquid; (e) sealing each microcell of the plurality of microcells with a sealing layer; and (f) attaching a first light transmissive electrode layer onto the sealing layer. If the light blocking composition comprises a solvent, the solvent is evaporated during the curing of the second dispersion composition. The curing of the light blocking composition may be achieved by UV irradiation, thermally, or by solvent evaporation.

BRIEF DESCRIPTION OF DRAWINGS

FIG. 22 is a micrograph of an open optical state of a microcell array of the variable light transmission device of Example 7, the electrophoretic medium of the device comprising white and black pigment particles.

DETAILED DESCRIPTION OF THE INVENTION

Figure 1:
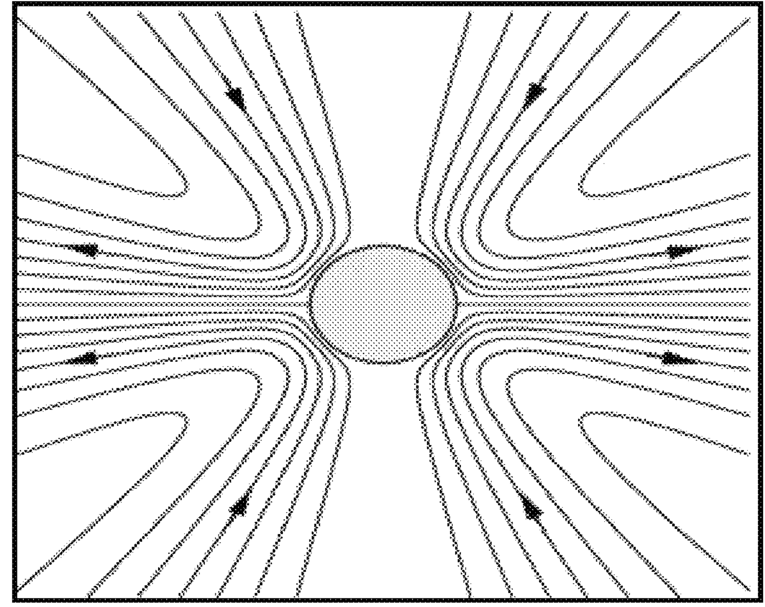
FIG. 1 is an illustration of a cylindrical particle in a liquid under the influence of an applied electric field and resulting forces on the particle.

The distance of a point from a plane is the shortest perpendicular distance from the point to the plane. The shortest distance from a point to a plane is the length of the perpendicular parallel to the normal vector dropped from the given point to the given plane.

The distance between two planes in a three-dimensional space is the shortest distance between the planes. It is the shortest distance between any point on one plane and any point of the other plane.

Slope of a cone is defined as the angle that has (a) vertex (A) on the circumference of the base of the cone, (b) first arm the line that connects point A (vertex) and the center of the base of the cone, and (c) second arm the line that connects point A (vertex) and the apex of the cone.

The term “electrically charged pigment particles” may refer to charged pigment particles that do not have any polymeric material on the surface of the pigment particles. The term “electrically charged pigment particles” may also refer to pigment particles that have a polymeric material on the surface of the pigment particles.

A “microcell inside wall surface” is the surface of the microcell wall that is in contact with the electrophoretic medium of the microcell.

A “microcell wall upper surface” is the surface of the microcell wall that is in contact with the sealing layer of the microcell. In the case that there is a light blocking layer on the microcell wall upper surface, the light blocking layer is disposed between the microcell wall upper surface and the sealing layer.

The term “DC-balanced waveform” or “DC-balanced driving waveform” applied to a pixel is a driving waveform where the driving voltage applied to the pixel is substantially zero when integrated over the period of the application of the entire waveform. The DC balance can be achieved by having each stage of the waveform balanced, that is, a first positive voltage will be chosen such that integrating over the subsequent negative voltage results in zero or substantially zero. If the waveform is not DC-balanced, it is referred to as “DC-imbalanced waveform” or “DC-imbalanced driving waveform". The driving waveform applied to a pixel may have a portion that is DC-imbalanced and at least one additional pulse of the opposite impulse to ensure that the overall waveform applied to a pixel is DC-balanced. This additional pulse may be applied before the DC-imbalanced portion of the waveform (pre-pulse). Typical examples of DC-imbalanced waveforms include (a) a square or sinusoidal AC waveform having a duty cycle of less (or more) than 50%, and (b) square or sinusoidal AC waveform that has a DC offset.

The term "impulse" is the integral of voltage with respect to time. That is, for a waveform pulse having a voltage V applied for time t, the impulse is V×t. The impulse can be positive, if the polarity of voltage V is positive, or negative, if the polarity of voltage V is negative.

The term "net positive impulse" of a waveform means that negatively electrically charged pigment particles will be attracted to and will move towards the first light transmissive electrode layer during the application of the waveform.

The term "lateral component of velocity" in relation to the movement of electrically charged pigment particles in a microcell of the variable light transmission device of the present invention is the velocity in the horizontal direction. For this definition, we assume that the velocity of the electrically charged particles is a vector resulting from the vector addition of the velocity in the horizontal direction (Vh), and the velocity in the vertical direction (Vv), and that the vertical direction in the case of the movement of the electrically charged pigment particles inside an electrophoretic microcell is the direction from the first light transmissive electrode layer to the second light transmissive electrode layer or form the second light transmissive electrode layer to the first light transmissive electrode layer. In the same system, the horizontal direction of the movement of the electrically charged pigment particles inside an electrophoretic microcell is the direction from one side of the microcell wall to the other side of the microcell wall, this direction being parallel to the first light transmissive electrode layer. Thus, the statement "the velocity of the electrically charged pigment particles has a lateral component" means that the magnitude of the velocity in the horizontal direction is larger than zero.

The phenomenon of Induce-Charge-Electro-Osmosis (ICEO) can be utilized to move polarizable particles, such as pigment particles, that are present in an electrophoretic medium, laterally. That is, the polarizable particles can move parallelly to the electrode layers that sandwich the electrophoretic medium. In the presence of an electric field, a particle may experience a force, which is caused by polarization of the particle (or by polarization of an adsorbed conductive coating on the particle surface, or of the electrical double layer around the particle). This force may result in a perturbation in the flow of mobile charge, such as ions or charged micelles, in the electrophoretic medium, as shown in FIG. 1 for a cylindrical particle 101 surrounded by the liquid of the electrophoretic medium in the applied electric field. This figure is reproduced by the article of Bazant and Squires, J. Fluid Mech., 2004, 509, 217-252.

A perfectly symmetrical, spherical particle would experience no net force, but less symmetrical particles would experience forces having a component perpendicular to the direction of the applied field. The cooperative flows, which are created by a swarm of particles each experiencing such forces, can lead to "swirling" of an electrophoretic medium containing multiple particles. The maximum velocity u of this swirling for a particular particle, according to the theory advanced in the article by Bazant and Squires, would be given approximately by Expression (1).

$$u \propto \frac{\varepsilon R E^2}{\eta(1+\omega^2\tau^2)} \quad \text{Expression (1)}$$

In Expression (1), E is the field strength, ε is the dielectric constant of the solvent, η is the viscosity of the electrophoretic fluid, ω is the applied sinusoidal AC frequency, and τ is the time scale for building up a screening charge layer by motion of solvent-borne charges around charge. The time scale t is given by Equation (2).

$$\tau = \frac{\lambda_D R}{D} \quad \text{Equation (2)}$$

In Equation (2), $\lambda_D$ is the Debye screening length, R is the particle radius, and D is the diffusion constant of charge carriers in the fluid.

According to Expression (1), as the frequency is raised, the value of $\omega^2\tau^2$ increases and the maximum velocity of induced-charge flows decreases. Furthermore, for values of $\omega^2\tau^2$ that are significantly larger than 1, the maximum swirling velocity is proportional to the square of the ratio E/ω. Induced-charge flows occur in the same direction regardless of the polarity of the applied electric field, and can thus be driven by alternating fields.

When the electrophoretic medium is contained within a microcell, as is preferred in electrophoretic displays, the geometries of the induced flows are affected by the shape of the particular microcell used. For example, in the simplest case of two parallel electrodes, it was shown that, using an appropriate electric field strength and AC frequency, the flow can adopt a roll structure with periodic spacing that corresponds to the width of the gap between the electrodes.

Figures 2A, 2B:
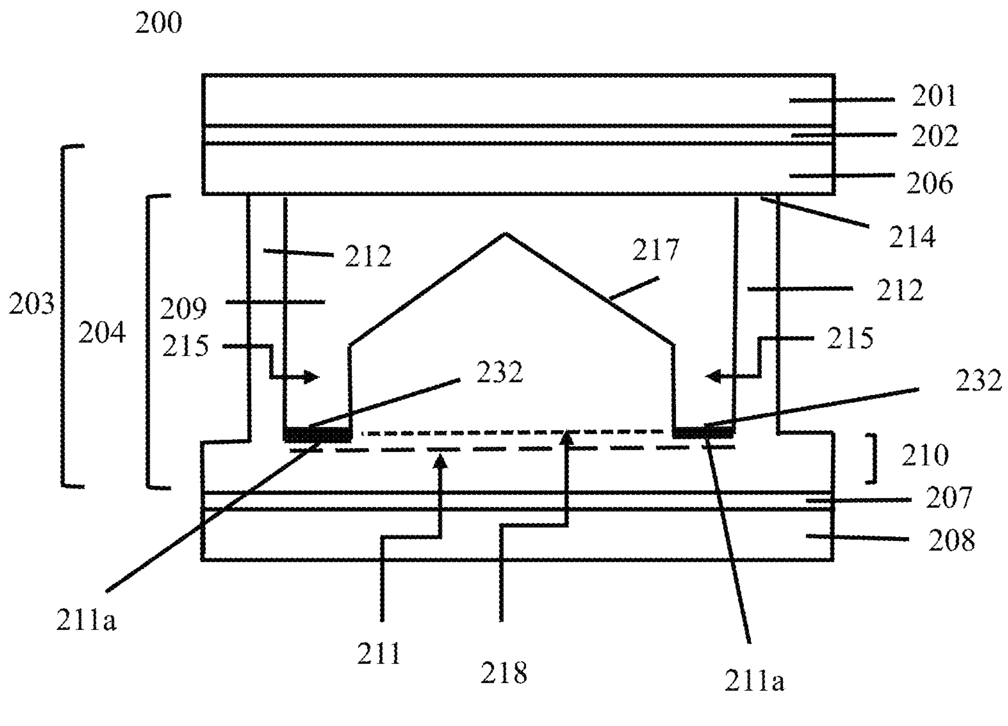
FIGS. 2A, 2B, 2C and 2D represent a side view of an example of a portion of a variable light transmission device of the present invention.
Figure 2C:
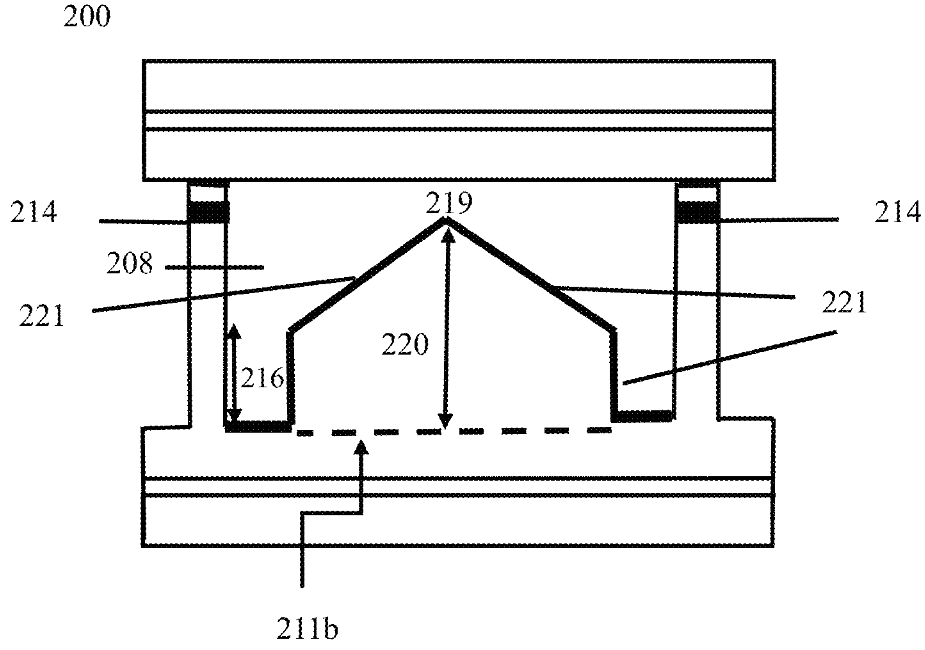

The inventors of the present invention used complex microcell structures that were formed by an embossing method to make switchable devices. In one example, the embossed structure includes a conical protrusion on the bottom of each microcell. FIGS. 2A, 2B, and 2C illustrate an example of a variable light transmission device according to the present invention wherein the protrusion structure of the variable light transmission device is a cone on a cylinder. The cone of the protrusion structure can direct the electrophoretic flow of particles into a channel, as shown in FIGS. 2A, 2B, 2C. The electrically charged pigment particles will move towards the channel, if the electric field applied across the electrophoretic medium has the appropriate polarity in relation to the polarity of the electrically charged pigment particles. For example, the electrically charged pigment particles will move towards the channel, if the electrically charged pigment particles are positively charged and the applied voltage via the light transmissive electrodes results in negative polarity on the second light transmissive electrode. The same movement will take place if the electrically charged pigment particles are negatively charged and the applied voltage via the light transmissive electrodes results in positive polarity on the second light transmissive electrode. FIGS. 2A, 2B, and 2C illustrate a cross-section (not to scale) of a portion of a variable light transmission device that shows only one microcell of the plurality of microcells of the device. All three FIGS. 2A, 2B, 2C are identical in terms of the device structure that is illustrated, but different parts of the device are identified on each of the figures.

The portion of the variable light transmission device 200 of FIGS. 2A, 2B, and 2C comprises a microcell layer comprising a plurality of microcells and a sealing layer. Although only one microcell is represented in FIGS. 2A, 2B, and 2C, one can envision the whole variable light transmission device that comprises the plurality of microcells. The variable light transmission device may comprise first transparent substrate 201, first light transmissive electrode layer 202, a microcell layer 203 comprising a plurality or microcells 204 and a sealing layer 206, second light transmissive electrode layer 207, and second transparent substrate 208. Each microcell of the plurality of microcells 204 comprises an electrophoretic medium 209 including electrically charged pigment particles and a charge control agent in a non-polar liquid. The components of the electrophoretic medium (electrically charged pigment particles, charge control agent, non-polar liquid) are not shown in FIGS. 2A, 2B, and 2C. Each microcell of the plurality of microcells 204 has a microcell opening 205, the sealing layer 206 spanning the microcell openings 205 of the plurality of microcells 204. Each microcell of the plurality of microcells 204 comprises microcell bottom layer 210, protrusion structure 217, microcell walls 212, and channel 215. Microcell bottom layer 210 has microcell bottom inside surface 211, the microcell bottom inside surface 211 that comprises exposed microcell bottom inside surface 211*a* and unexposed microcell bottom inside surface 211*b*. Unexposed microcell bottom surface 211*b* is in contact with the protrusion base 218.

Each microcell of the plurality of microcells (204) comprises a first light blocking layer (232), the first light blocking layer (232) being in contact with the exposed microcell bottom inside surface (211*a*) and with the electrophoretic medium (209), In this example, the protrusion structure 217 is a cone on a cylinder. The protrusion structure 217 has a protrusion base 218, a protrusion surface 221, a protrusion apex 219, and a protrusion height 220. The protrusion apex 219 is a point or a set of points of the protrusion structure 217 having shorter distance from microcell opening 205 than all other points of the protrusion structure 217. In the example of the variable light transmission device of FIGS. 2A, 2B, and 2C, the protrusion apex 219 is the apex of the cone of the protrusion structure. The protrusion height 220 is the distance between the protrusion base 218 and the protrusion apex 219. If the protrusion structure 217 has a protrusion apex 219 that comprises more than one points, such as a planar surface, the protrusion height 220 is the distance between the planar surface and the protrusion base 218 of the protrusion structure 217. A microcell layer comprising a plurality of microcells 204 having a protrusion structure 217 may be manufactured by embossing thermoplastic or thermoset precursor layer using a pre-patterned male mold, followed by releasing the mold. The precursor layer may be hardened by radiation, cooling, solvent evaporation, or other means during or after the embossing step.

Microcell walls 212 have microcell inside wall surface 213 and a microcell wall upper surface 214. The microcell inside wall surface 213 is in contact with the electrophoretic medium 209. The microcell wall upper surface 214 is the surface of microcell walls 212 of a microcell that is in contact with sealing layer 206.

Channel 215 is the volume between first light blocking layer 232, microcell inside wall surface 213, and protrusion surface 221. Channel 215 is the volume location where most of the electrically-charge particles are present in the open optical state of the device. Channel 215 has a channel height 216 that is 50% of the protrusion height 220. Thus, the channel height further defines the channel, along with exposed microcell bottom inside surface 211*a*, microcell inside wall surface 213, and protrusion surface 221.

The inventive variable light transmission device may comprise a second light blocking layer 233.

The second light blocking layer 233 may be disposed between the microcell wall upper surface 214 and sealing layer 206. An auxiliary layer 234 may be disposed between second light blocking layer 233 and sealing layer 206, as shown in FIG. 2B.

Figure 2D:
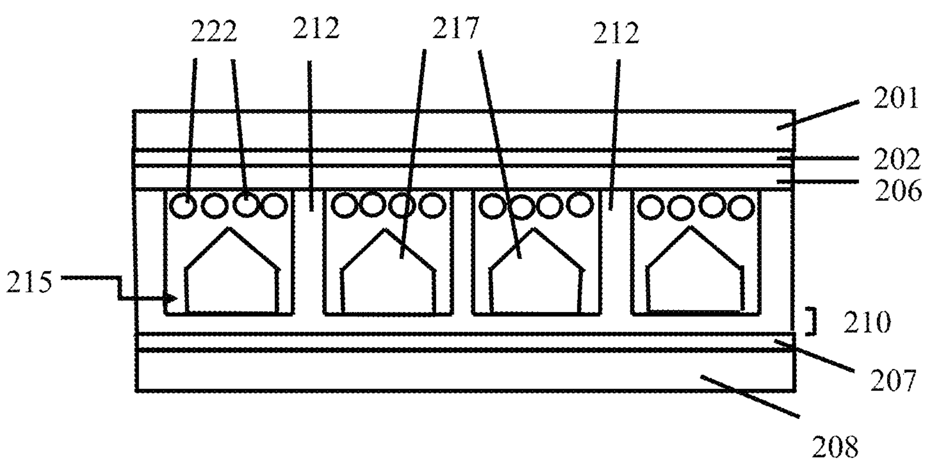

FIG. 2D illustrate an example of a variable light transmission device according to the present invention wherein the protrusion structure of the variable light transmission device is a cone on a cylinder. The variable light transmission device of FIG. 2D is similar to that illustrated by FIGS. 2A, 2B, 2C, but shows a larger portion of the device that includes four microcells. Variable light transmission device 200 comprises first transparent substrate 201, first light-transmissive electrode layer 202, a microcell layer 203 comprising a plurality or microcells 204 and a sealing layer 206, second light transmissive electrode layer 207, and second transparent substrate 208. Each microcell of the plurality of microcells comprises an electrophoretic medium including electrically charged pigment particles 222 and a charge control agent in a non-polar liquid. Each microcell of the plurality of microcells 204 has a microcell opening, the sealing layer 206 spanning the microcell openings of the plurality of microcells. Each microcell of the plurality of microcells comprises microcell bottom layer 210, protrusion structure 217, microcell walls 212, and channel 215. The variable light transmission device illustrated in FIG. 2D is in the closed optical state.

Figure 3:
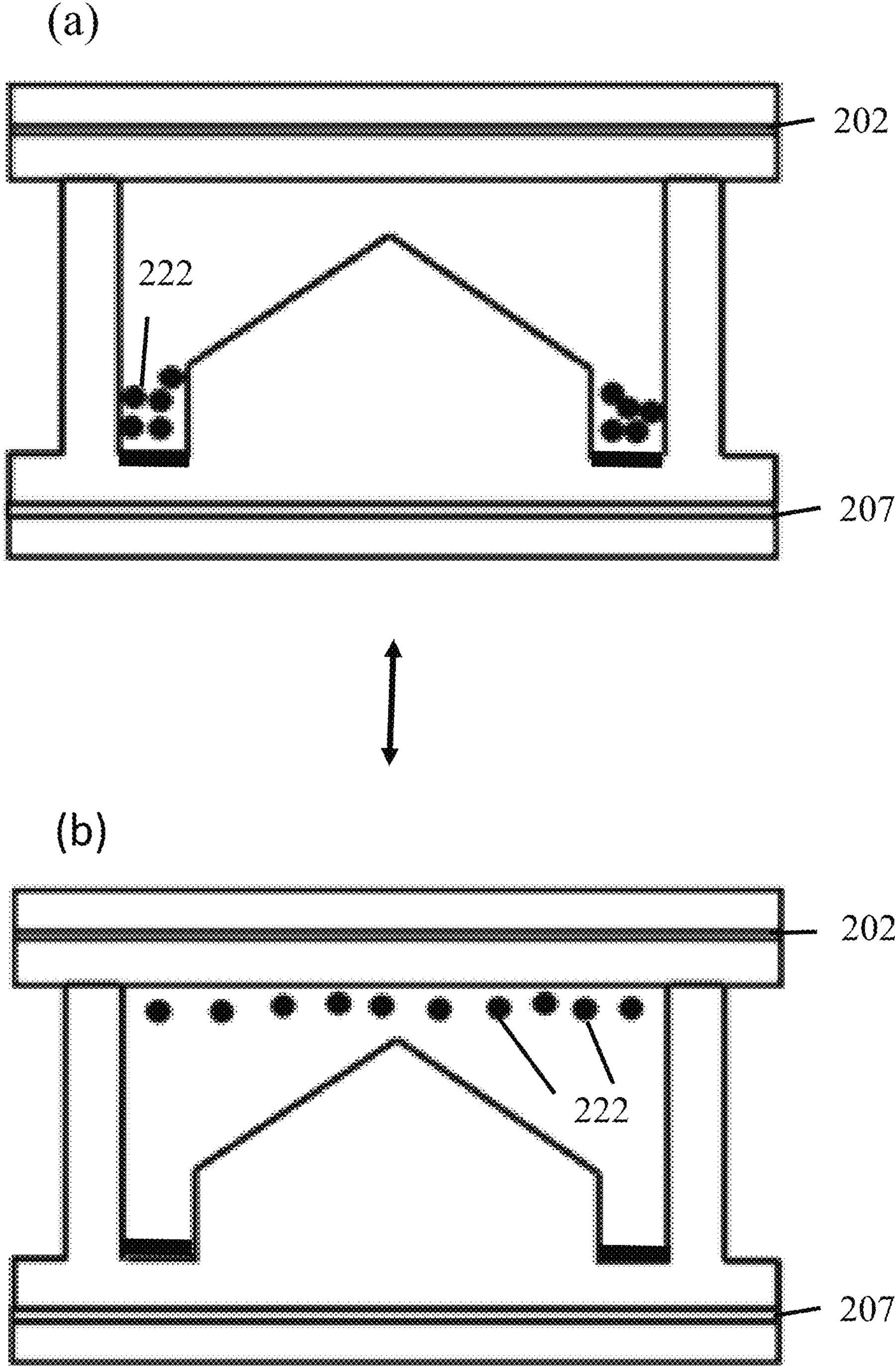
FIG. 3 illustrates a side view of a microcell in the open optical state and a side view of a microcell in the closed optical state.

When a first electric field is applied between the first light transmissive electrode layer 202 and the second light transmissive electrode layer 207 via a first waveform, movement of the electrically charged pigment particles 222 towards the channel is caused when the polarity of the electrically charged pigment particles 222 and the voltage polarity of the second light transmissive electrode layer are opposite to each other. If the polarity of the electrically charged pigment particles 222 and the voltage polarity of the second light transmissive electrode layer are opposite to each other, the electrically charged pigment particles 222 will be attracted by the second light transmissive electrode, and the variable light transmission device will switch to an open optical state, the open optical state having higher percent light transmission than the closed optical state. The open optical state is illustrated in FIG. 3*a*, where electrically charged pigment particles 222 are represented by black filled circles. In this example, the electrophoretic medium comprises one type of electrically charged pigment particles 222.

Application of a second electric field between the first light transmissive electrode layer 202 and the second light transmissive electrode layer 207 via a second waveform causes a movement of the electrically charged pigment particles 222 towards the first light transmissive electrode layer 202 with a velocity. This leads to the closed optical state, which is shown in FIG. 3*b*. The velocity has a lateral component. In the absence of a lateral component of the velocity, the closed optical state will not take place, because the electrically charged pigment particles 222 will move from the channel of the open state towards the first light transmissive electrode layer 202, but these electrically charged pigment particles 222 will occupy an area near the perimeter of a microcell at the vicinity of the sealing layer 206. That is, electrically charged pigment particles 222 will not be spread all across the surface of the first light transmissive electrode layer 202. Thus, the closed optical state will not be effectively formed, because the closed optical state will have relatively high light transmittance.

The above indicates that it is somewhat easier to achieve a transition from the closed optical state to the open optical state, because the slope of the protrusion structure (for example, the cone of FIGS. 3*a* and 3*b*) will impart a lateral component to the velocity of the electrically charged pigment particles when they strike the protrusion surface of the protrusion structure during their movement towards second light transmissive electrode layer.

It is possible to shape the electric field within the variable light transmission device by making the electrical conductivities of the electrophoretic medium and the cone substantially different from each other. For example, if the cone is much less conductive than the electrophoretic medium, the field lines will tend to direct the electrically charged pigment particles into the channel. However, even in such a case it may still be necessary to provide a more substantial horizontal force component to redisperse the electrically charged pigment particles from the channel. In addition, in the current state of the art it is easier to assemble and operate the device when the resistivities of the cone material and the electrophoretic medium are about equal, each being about $10^{10}$ Ω*cm, in which case the electric field lines will be roughly vertical through the unit. Thus, it would be preferred to use a waveform in which lateral motion is imparted to the electrically charged pigment particles.

The method of operation of a variable light transmission device includes a step of applying a first electric field between the first light transmissive electrode layer and the second light transmissive electrode layer via a first waveform to cause movement of the electrically charged pigment particles towards the channel, resulting in the switching of the variable light transmission device to an open optical state, the electrically charged pigment particles in the open optical state being located inside the channel. The method of operation of a variable light transmission device also includes a step of applying a second electric field between the first light transmissive electrode layer and the second light transmissive electrode layer via a second waveform to cause a movement of the electrically charged pigment particles towards the first light transmissive electrode layer with a velocity, the velocity having a lateral component, and leading to a closed optical state, the second waveform comprising a series of at least two positive and negative pulses having a net positive or net negative impulse, wherein the closed optical state has lower percent light transmission than the open optical state.

The second waveform may be DC-imbalanced. The second waveform may comprise at least one positive voltage and at least one negative voltage, the second waveform having a net positive or a net negative impulse. The choice of a net positive or net negative impulse depends on the polarity of the electrically charged pigment particles. Specifically, if the electrically charged pigment particles are negatively charged, a net positive impulse is required to move them from the particles from the channel towards the first light transmissive electrode layer. In other words, this movement requires that the net result of the applied voltage is an attraction of the negatively charged particles by a positive voltage of the first light transmissive electrode layer in relation to the second light transmissive electrode layer. On the contrary, if the electrically charged pigment particles are positively charged, a net negative impulse is required to move the electrically charged pigment particles from the channel near the second light transmissive electrode layer 207 towards the first light transmissive electrode layer.

A second electric field that is applied between the two light transmissive electrode layers via a second waveform achieves a closed optical state.

In a first embodiment, the second waveform comprises an AC waveform, having a duty cycle different from 50%. An example of the second waveform of the first embodiment is illustrated in FIG. 4.

The AC waveform may have a positive or negative DC biased. DC bias may be achieved by controlling the duty cycle of the waveform. The duty cycle for a positively DC biased waveform is higher than 50%. The duty cycle of a positively DC biased waveform may be higher than 55%, higher than 60%, or higher than 65%. The duty cycle for a positively DC biased waveform may be from 55% to 95%, from 58% to 90%, from 60% to 88%, from 65% to 85%, or from 70% to 80%. Analogously, the duty cycle for a negatively DC biased waveform is lower than 50%. The duty cycle for a negatively DC biased waveform may be lower than 45%, lower than 40%, or lower than 35%. The duty cycle for a negatively DC biased waveform may be from 5% to 45%, from 8% to 40%, from 10% to 38%, from 15% to 35%, or from 20% to 30%.

Figure 4:
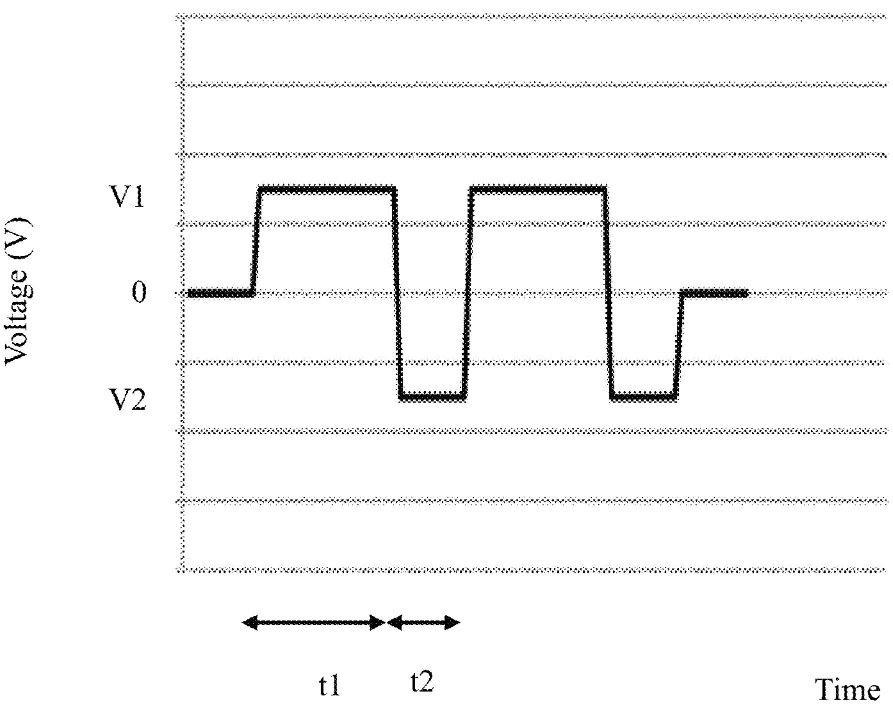
FIG. 4 is an example of a first embodiment of the present invention; this example is a DC-imbalanced waveform that can be applied on a variable light transmittance device to achieve a closed state; the waveform includes an AC waveform having a duty cycle that is higher than 50%.

The waveform illustrated in the example of FIG. 4 comprises an AC square waveform having two or more cycles. Each cycle may comprise a first pulse of amplitude V1 applied for time period t1 and a second pulse of amplitude V2 applied for time period t2, wherein V1 is positive and V2 is negative, and wherein t1 is larger than t2. In the case that the amplitude of V1 is equal the amplitude of V2 (|V1|=|V2|), a DC bias is achieved by the difference in the time periods. In the case of the example of FIG. 4, there is a positive DC bias, because the positive voltage V1 is applied for a longer time period (t1) than that of the negative voltage V2 (t2). Positive DC bias means that, if the electrically charged pigment particles of the variable light transmission device are negatively charged, the electrically charged pigment particles will move towards the first light transmission electrode layer of the device. The duty cycle of the waveform can be calculated by Equation (3).

$$\text{Duty Cycle}=100\times(V1\cdot t1)/[(V1\cdot t2)+((V2\cdot t2)] \quad \text{Equation (3)}$$

In the waveform example of FIG. 4, the amplitude of V1 can be equal to the amplitude V2 (|V1|=|V2|), but, in general, the amplitudes V1 and V2 may be different from each other.

The example of the driving waveform of FIG. 4 is DC-imbalanced. However, one or more additional pulses may be included in the waveform of FIG. 4 of the opposite impulse, which can ensure that the overall waveform applied on a pixel is DC-balanced. This additional pulse (or additional pulses) may be applied before the DC-imbalanced waveform (pre-pulse). Also, the example of the waveform of FIG. 4 is a square AC waveform. Other examples of AC waveforms that can be used include sinusoidal waveforms, trigonal waveforms, and sawtooth waveforms.

The AC waveform of the first embodiment may have an amplitude of from 10V to 200V and a frequency of from 0.1 to 6000 Hz. The AC waveform may have an amplitude of from 15V to 180V, from 20V to 160V, from 25V to 150V, or from 30V to 140V. The AC waveform may have a frequency of from 0.5 Hz to 5000 Hz, from 1 Hz to 4000 Hz, from 5 Hz to 3000 Hz, from 10 Hz to 2000 Hz, from 15 Hz to 1000 Hz, from 20 Hz to 800 Hz, or from 25 to 600 Hz. The ratio of the frequency of the AC waveform to the weight percent content of the charge control agent by weight of the electrophoretic medium may be from 400 Hz to 2000 Hz.

In a second embodiment, the second waveform may comprise a waveform that is formed by a superposition of a DC voltage component and an AC waveform. An example of the second waveform of the second embodiment is illustrated in FIG. 5.

Figure 5:
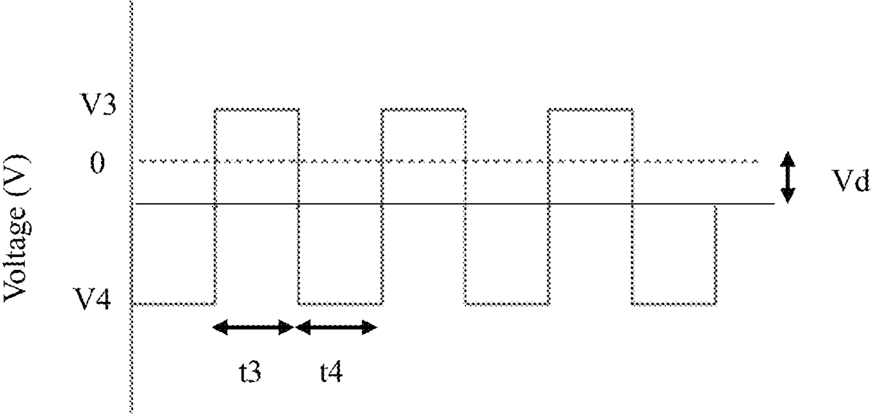
FIG. 5 is an example of a second embodiment of the present invention; this example is DC-imbalanced waveform that can be applied on a variable light transmittance device to achieve a closed state; the waveform is a superposition of a DC voltage component and an AC waveform.

The waveform of FIG. 5 has a net negative impulse because of a DC offset (Vd). Although the period of time (t3) of the application of positive pulse is equal to the period of time (t4) of the application of negative pulse, a DC bias is achieved by the difference in the amplitudes of the pulses. Specifically, amplitude V3 of the positive pulse is smaller than amplitude V4 of the negative pulse. This is caused by the DC voltage component Vd of the waveform. That is, the waveform illustrated in FIG. 5 has a DC offset.

The example of the driving waveform of FIG. 5 is DC-imbalanced. However, one or more additional pulses may be included in the waveform of FIG. 5 of the opposite impulse, which can ensure that the overall waveform applied on a pixel is DC-balanced. This additional pulse (or additional pulses) may be applied before the DC-imbalanced waveform (pre-pulse). Also, the example of the waveform of FIG. 5 is a square AC waveform. Other examples of AC waveforms that may be used include a sinusoidal waveform, a trigonal waveform, and a sawtooth waveform.

The AC waveform may have an amplitude of from 10V to 200V and a frequency of from 0.1 to 6000 Hz. The AC waveform may have an amplitude of from 15V to 180V, from 20V to 160V, from 25V to 150V, or from 30V to 140V. The AC waveform may have a frequency of from 0.5 Hz to 5000 Hz, from 1 Hz to 4000 Hz, from 5 Hz to 3000 Hz, from 10 Hz to 2000 Hz, from 15 Hz to 1000 Hz, from 20 Hz to 800 Hz, or from 25 to 600 Hz. The ratio of the frequency of the AC waveform to the weight percent content of the charge control agent by weight of the electrophoretic medium may be from 400 Hz to 2000 Hz.

Figure 6:
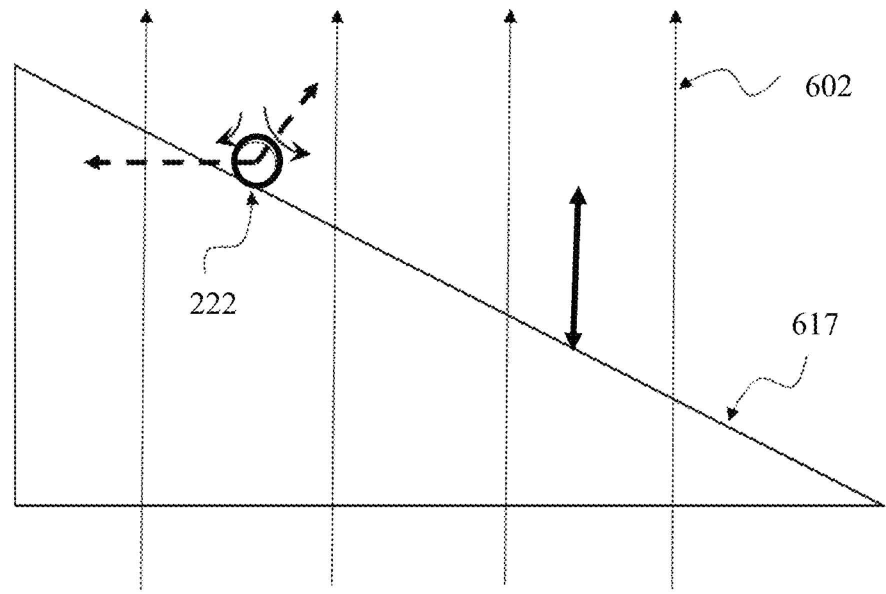
FIG. 6 illustrates the force exerted by an electrically charged pigment particle on the surface of a conical protrusion of the variable light transmission device of the present invention.

In a case when the ICEO-induced motion of the electrically charged pigment particles is relatively low, the protrusion structure of the microcell contributes to an effective operation of the variable transmission device, even if the device is driven using a DC-balanced AC waveform. In the example of the protrusion structure being a cone, any electrically charged pigment particles that are located at the surface of the cone will experience a net force that will move them towards the apex of the cone, as shown in FIG. 6. FIG. 6 shows electrically charged pigment particle 222 in contact with protrusion structure 617 (cone) in an electric field 602. In this case, the ICEO flows are illustrated by the curved arrows, being more constrained on the "uphill" side of the cone than the "downhill" side. This imparts a force to the particle shown by the dotted horizontal arrow. There will be an opposing force perpendicular to the cone, forcing the particle towards the apex of the cone. With an appropriate choice of AC fields and frequencies, the particles can be moved out of the channel region and up the sides of the cone in this way.

The electrophoretic medium of the variable light transmission device of the present invention comprises electrically charged pigment particles, a charge control agent, and a non-polar liquid.

The electrophoretic medium may comprise two types of electrically charged pigment particles, a first type of electrically charged pigment particles and a second type of electrically charged pigment particles. The first type of electrically charged pigment particles may be light reflecting and the second type of electrically charged pigment particles may be light absorbing. A typical example of light reflecting pigment particles is titanium dioxide, which has a white color. Typical examples of light absorbing pigment particles include organic and inorganic pigment particles having black, blue, cyan, magenta, red, green, yellow, and other colors. The first type of electrically charged pigment particles may have the same polarity as the second type of electrically charged pigment particles. The first type of electrically charged pigment particles may have opposite polarity from the second type of electrically charged pigment particles.

Figure 7:
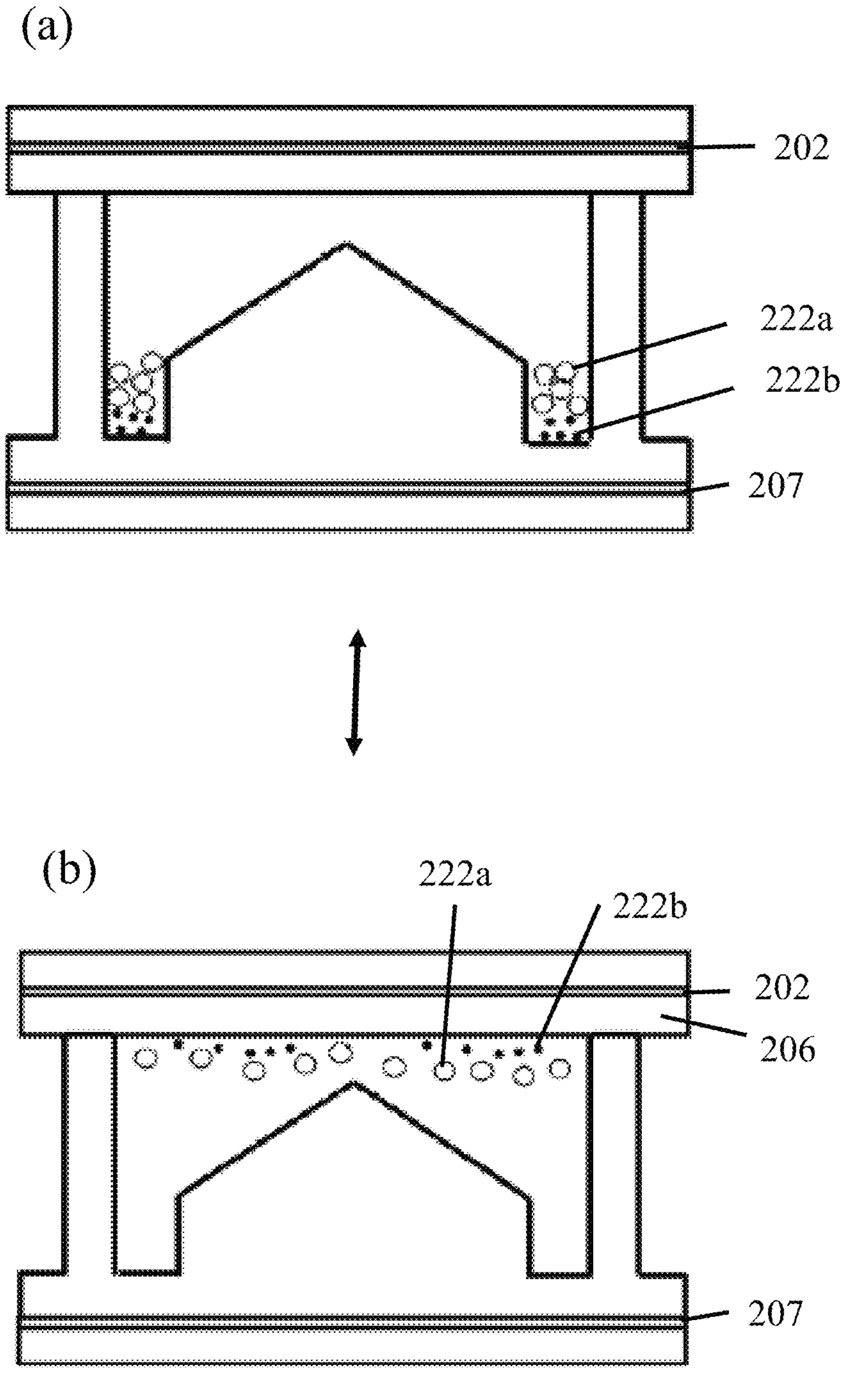
FIG. 7 illustrates a portion of a variable light transmission device having an electrophoretic medium comprising a first type of electrically charged pigment particles and a second type of electrically charged pigment particles, the first type of electrically charged pigment particles having the same polarity as the second type of electrically charged pigment particles.

In electrophoretic media having a first type of electrically charged pigment particles and a second type of electrically charged pigment particles with the same charge polarity, the zeta potential of the first type of electrically charged pigment particles may be lower than that of the second type of electrically charged pigment particles. Furthermore, the average particle size of the first type of electrically charged pigment particles may be larger than the average particle size of the second type of electrically charged pigment particles as determined by the average diameter of the pigment particles. The open optical state of this example of variable light transmission device is illustrated in FIG. 7*a*. In this example, upon application of the appropriate electric field between first light transmissive electrode layer 202 and second light transmissive electrode layer 207, both types of electrically charged pigment particles 222*a* (first type) and 222*b* (second type) will move into the channel of a microcell to form an open state. However, second type of electrically charged pigment particles 222*b* (light absorbing) will be placed below first type of electrically charged pigment particles 222*a* (light reflecting), because first type of electrically charged pigment particles 222*a* have a lower charge (and a larger size). In other words, second type of electrically charged pigment particles 222*b* will be placed closer to the first light blocking layer (bottom of the channel) than first type of electrically charged pigment particles 222*a*. The closed optical state of this example of variable light transmission device is illustrated in FIG. 7*b*. Upon application of the appropriate electric field between first light transmissive electrode layer 202 and second light transmissive electrode layer 207, both types of electrically charged pigment particles 222*a* and 222*b* will move towards the first light transmissive electrode layer to achieve a closed optical state. However, second type of electrically charged pigment particles 222*b* (light absorbing) will be positioned closer to sealing layer 206 than the first type of electrically charged pigment particles 222*a* (light reflecting), because first type of electrically charged pigment particles 222*a* have lower charge (and larger size).

Figure 8:
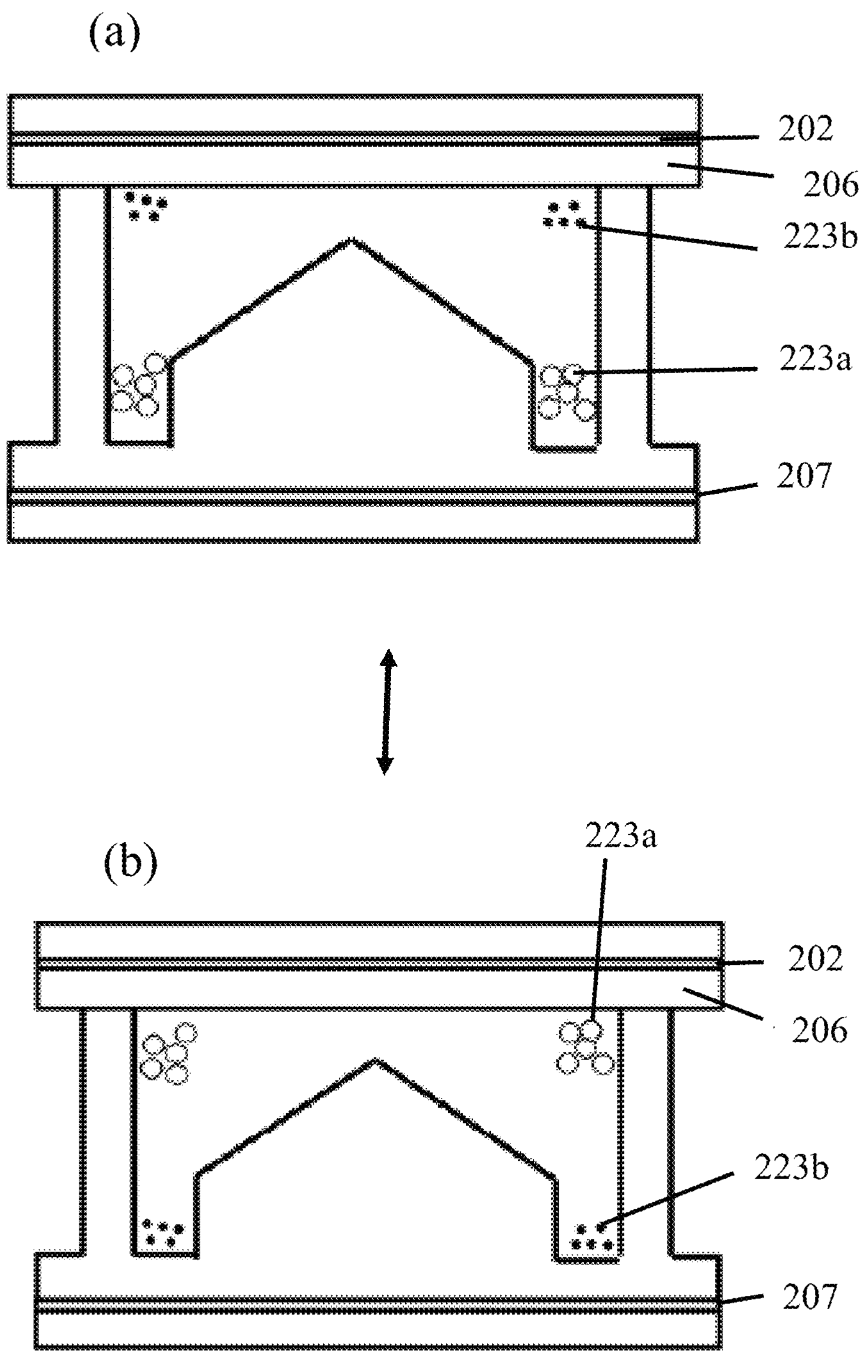
FIG. 8 illustrates a portion of a variable light transmission device having an electrophoretic medium comprising a first type of electrically charged pigment particles and a second type of electrically charged pigment particles, the first type of electrically charged pigment particles having opposite polarity from the second type of electrically charged pigment particles.

In another example, a variable light transmission device has an electrophoretic media including first type of electrically charged pigment particles (light reflecting) and second type of electrically charged pigment particles (light absorbing), wherein the first type of electrically charged pigment particles and the second type of electrically charged pigment particles have opposite charge polarities. Two possible open optical states of this example are illustrated in FIGS. 8*a* and 8*b* respectively. Upon application of the appropriate electric field between first light transmissive electrode layer 202 and second light transmissive electrode layer 207, depending on the polarity of the applied electric field, either the first electrically charged pigment particles 223*a* (light reflecting) or the second electrically charged pigment particles 223*b* (light absorbing) will move towards the channel (open optical state). The closed optical state may be formed by application of the appropriate electric field between first light transmissive electrode layer 202 and second light transmissive electrode layer 207 (second electric field) that causes one of the types of electrically charged pigment particles to move towards first light transmissive electrode layer 202 with velocity, the velocity having a lateral component. Depending on the applied electric field, either the first type of electrically charged pigment particles 223*a* or the second type of electrically charged pigment particles 223*b* will spread on the of the microcell area near sealing layer 206 (microcell opening).

The amount of second type of electrically charged pigment particles, which can have a black color, will be chosen to be sufficient to hide the white pigment in the channel (open optical state), when viewed from below, but not so high as to lead to too much light absorption in the closed state. "Viewed from below" means that the observer is located on the side of the variable light transmission device which is closer to the second light transmissive electrode layer 207, as opposed to the side that is closer to first light transmissive electrode layer 202.

It is desirable that the open optical state of a variable transmission device has high transmittance and low haze. Furthermore, in certain applications, such as building windows or vehicle sunroofs, it is desirable to manage the heating up of the building or the vehicle. Heat management is difficult when a variable transmission device comprising electrophoretic media including light absorbing electrically charged pigment particles. In the closed optical state of such devices, light incident on the device may be absorbed by the device, causing it to heat up. Incident light may include wavelengths within the solar spectrum, i.e., ultraviolet, visible, and infra-red. Another problem may be that the closed optical state is not completely opaque. That is, some of the incident light penetrates into the building or the vehicle, warming the interior of the building or the vehicle.

Figure 9:
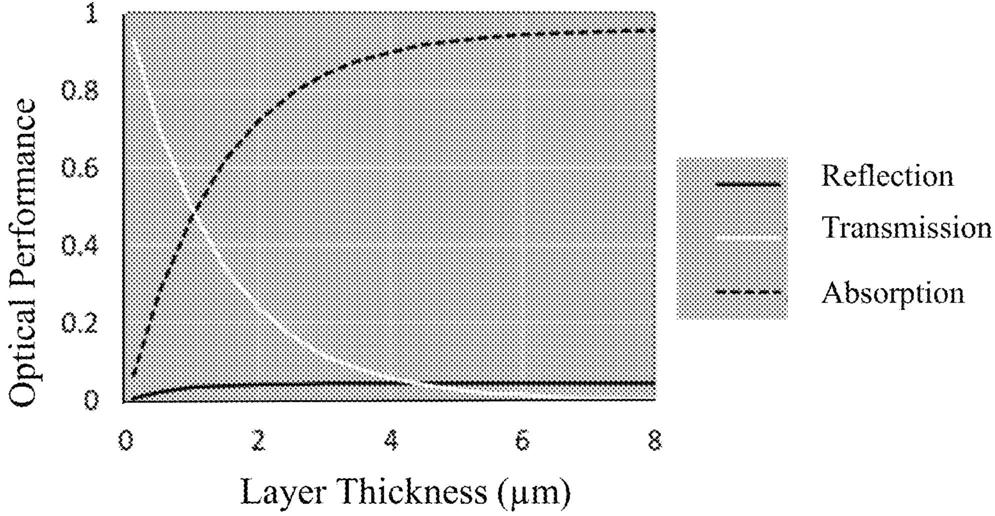
FIG. 9 provides graphs of light reflection, transmission, and absorption versus layer thickness of a layer comprising a light absorbing pigment particles.

FIG. 9 provides graphs of light reflection, transmission, and absorption versus layer thickness of a layer comprising a black pigment (light absorbing). That is, for each layer thickness, the graphs provide the amount of light that is reflected, transmitted, and absorbed as a ratio of the incident light.

Figure 10:
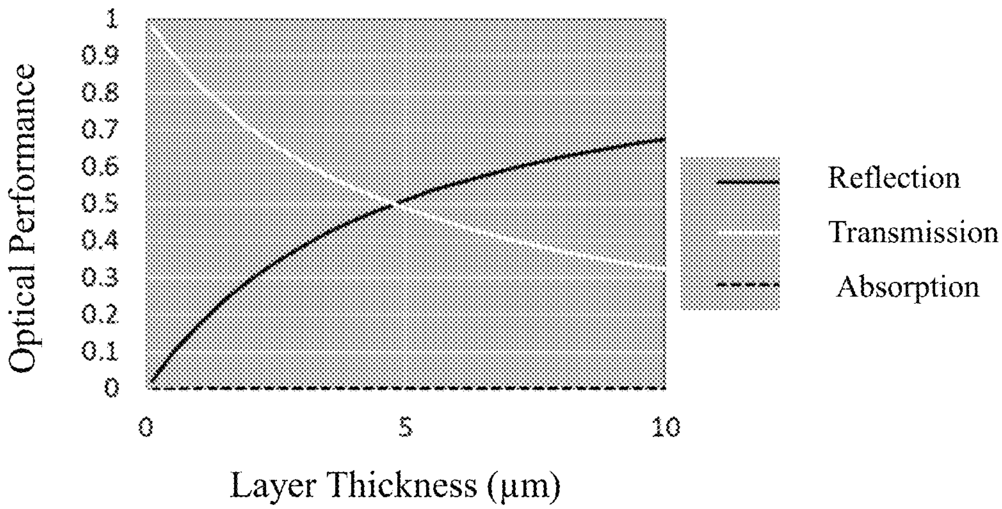
FIG. 10 provides graphs of light reflection, transmission, and absorption versus layer thickness of a layer comprising a light reflecting pigment particles.

FIG. 10 provides graphs of light reflection, transmission, and absorption versus layer thickness of a layer comprising a white pigment (light reflecting). That is, for each layer thickness, the graphs provide the amount of light that is reflected, transmitted, and absorbed as a ratio of the incident light.

FIGS. 9 and 10 indicate that white pigment reflects light significantly more than the black pigment, but does not absorb incident light. In fact white pigment provides opacity by light reflection/scattering. As the layer thickness increases, more incident light is reflected and less is transmitted. However, it is observed that variable light transmission devices that comprise media having white pigment particles (reflecting) may show significant haze in the open optical state.

The inventors of the present invention found that variable light transmission devices comprising electrophoretic media having electrically charged particles comprising reflecting pigment (first type) and electrically charged particles comprising absorbing pigment (second type) provides significant benefits, such as the reduction of haze. The reflecting pigment may be titanium dioxide and the absorbing pigment may be inorganic black, such as iron oxide black.

Figure 11:
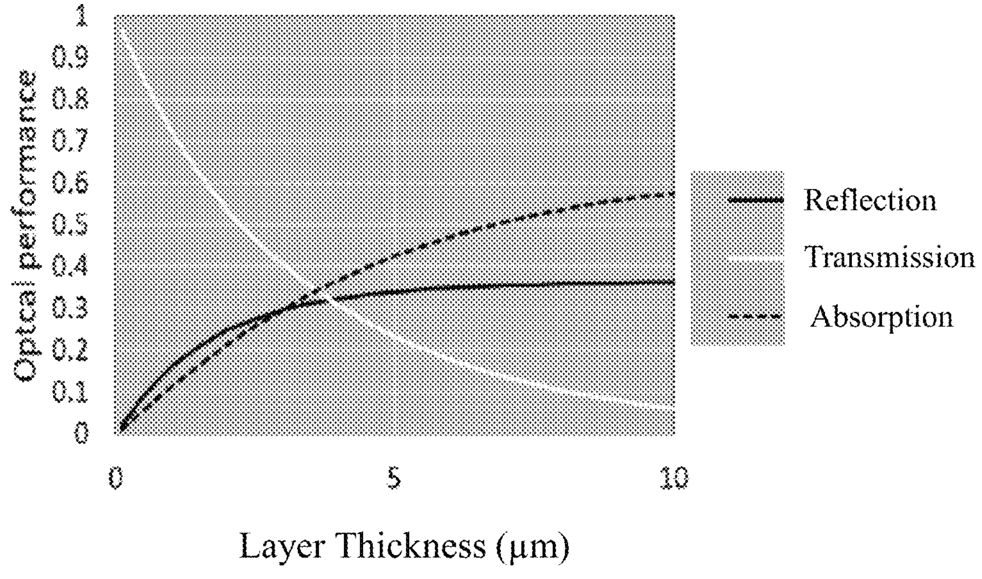
FIG. 11 shows a graph providing the effect on the reflection, transmission, and absorption versus layer thickness of a layer of a closed optical state comprising a combination of light reflecting pigment particles and light absorbing pigment particles.

FIG. 11 shows the effect on the reflection, transmission, and absorption versus layer thickness of a layer of a closed optical state comprising a combination of white pigment (light reflecting) and black pigment (absorbing). The weight ratio of black to white pigments is 0.1. That is, for each layer thickness, the graphs provide the amount of light that is reflected, transmitted, and absorbed as a ratio of the incident light.

The rate of the decrease of transmission with increasing layer thickness remains almost unchanged, but the reflection from white pigment is capped at 30%. Absorption increases with layer thickness, but only about at half the rate compared to a pure black pigment layer, which is shown in FIG. 9. Less absorption with its unwanted thermal effects would be achieved by layering the white pigment in front of the black, instead of mixing the two.

In the example of the variable transmission device having an electrophoretic medium including first type of electrically charged pigment particles (white or reflecting having a negative charge polarity) and second type of electrically charged pigment particles (black or absorbing having a positive polarity), the relative position of the two types of electrically charged pigment particles in the open and close optical states can be controlled by the applied electric field. For each type of electrically charged pigment particles, the polarizability and size of the particles determines the frequency required for optimal motion. The maximum ICEO velocity for these two types of oppositely charged pigment particles can be achieved by using electric fields comprising AC waveforms of different frequencies. In Example 7 below, which is related to this scenario, the characteristic AC waveform frequency is much higher for the white pigment than for the black pigment. Thus, the black pigment can be switched into the channel using a relatively low AC frequency with a superimposed DC offset appropriate to move that black pigment in the channel of the microcell as illustrated in the Figures. Because the black pigment is positively charged, application of a positive offset voltage applied to an AC voltage on the first light transmissive electrode layer, while the second light transmissive electrode layer is grounded, will move the black pigment into the channel. The AC frequency is relatively low (10 Hz); at this frequency both the white and black pigments have a strong ICEO-induced lateral motion. Once the black pigment is located in the channel, the AC frequency is increased to a higher value. At high frequency, the ICEO-induced motion of the black pigment is reduced, but that of the white pigment is maintained. Thus, the white pigment can be switched into the channel by a negative DC offset to the AC waveform. Both white and black particles are present in the channel (as shown in FIG. 7*a*. Although, under certain conditions, the electric field of the second step may drive a portion of the black pigment particles out of the channel, it will not move the black pigment laterally. Thus, the black particles that may move out of the channel will undergo a vertical motion to provide the open optical state similar to that illustrated in FIG. 8*a*.

Figure 12:
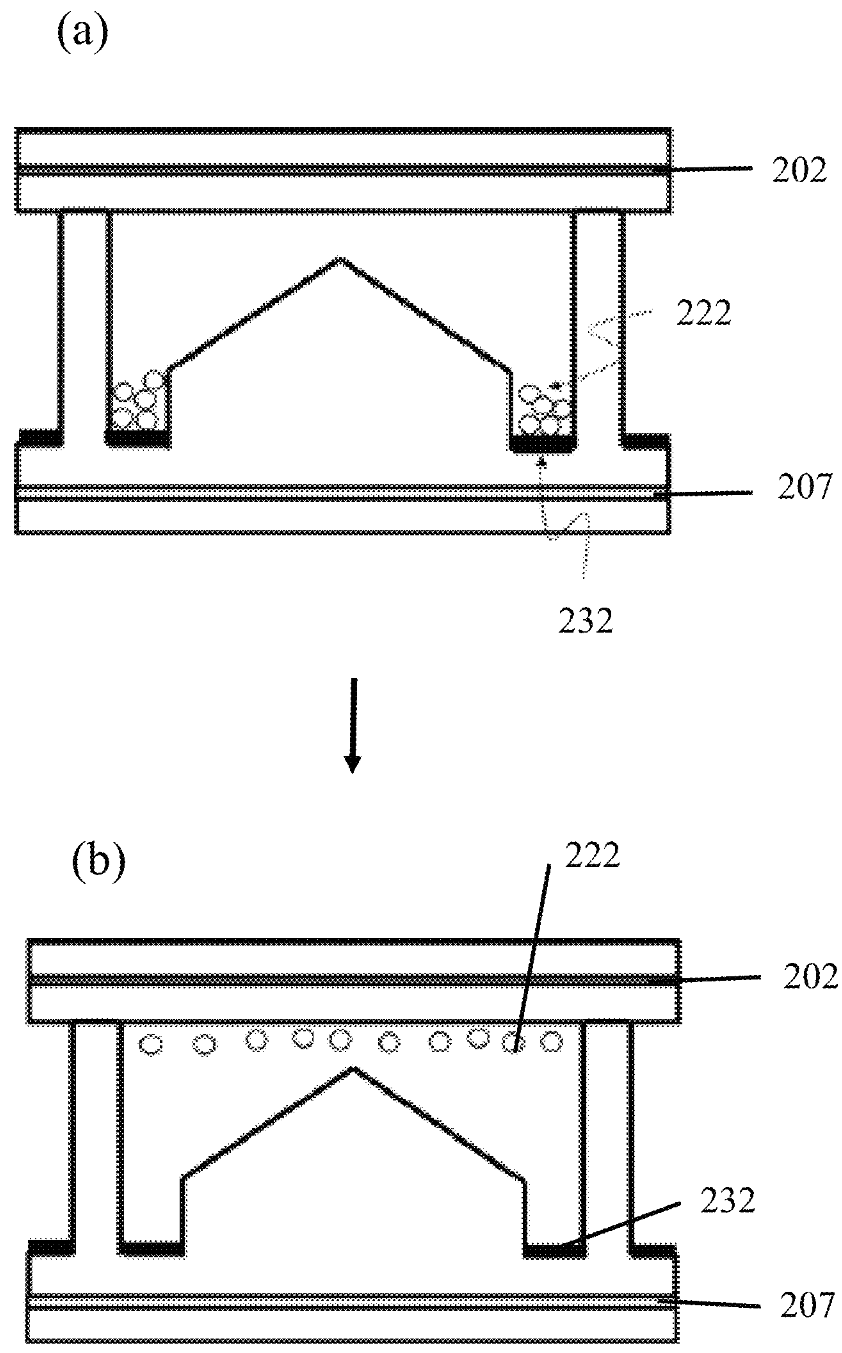
FIG. 12 illustrates a portion of a variable light transmission device comprising a light blocking layer on the exposed microcell bottom inside surface.

Another way to reduce the haze of the variable light transmission device that is caused by light scattering effects caused by electrically charged pigment particles is shown in FIG. 12. FIG. 12 illustrate a side view of an inventive variable light transmission device comprising a first light transmissive electrode layer 202, a second light transmissive electrode layer, and an electrophoretic medium including electrically charged pigment particles 222, the electrically charged pigment particles being light reflective. The variable light transmission device also comprises a first light blocking layer 232 on the exposed microcell bottom inside surface of the microcell. The first light blocking layer 232 may comprise black pigment particles that are light absorbing. In the open optical state of the device, the electrically charged pigment particles of the electrophoretic medium are included in the channel of the microcell (FIG. 12*a*). The first light blocking layer 232 blocks the haze, when the device is viewed from the bottom. Viewed from the bottom means that the observer views the device from the side that is near the second light transmissive electrode layer 207. However, the haze is still apparent, when the device is viewed from the top. Viewed from the top means that the observer views the device from the side that is near the first light transmissive electrode layer 202. FIG. 12*b* illustrates the closed optical state of the device. The variable light transmission device shown in FIG. 12 can be used for applications where the viewer is generally positioned on one side of the variable light transmission device, such as, for example a sunroof.

A method of manufacture of the variable light transmission device shown in FIG. 12 comprises the steps of (a) providing an assembly comprising a third electrode layer, a second light transmissive electrode layer, a layer comprising a plurality of microcells, the layer comprising a plurality of microcells being disposed between the third electrode layer and the second light transmissive electrode layer, each microcell of the plurality of microcells including a light blocking composition comprising (i) light absorbing electrically charged pigment particles, (ii) a polymer, oligomer, or monomer and, (iii) optionally, a solvent, each microcell of the plurality of microcells having a microcell opening, the third electrode layer spanning the microcell openings of the plurality of microcells, each microcell of the plurality of microcells comprising a microcell bottom layer, a protrusion structure, microcell walls, and a channel, the microcell bottom layer having a microcell bottom inside surface, the microcell bottom inside surface comprising an exposed microcell bottom inside surface and an unexposed microcell bottom inside surface; (b) applying an electric field between the third electrode layer and the second light transmissive electrode layer via a waveform that causes movement of the light absorbing electrically charged pigment particles of the light blocking composition towards the channel and resulting in a state in which state the light absorbing electrically charged pigment particles are located inside the channel; (c) curing the light blocking composition to form a light blocking layer on the exposed microcell bottom inside surface; (d) removing the third electrode layer; (e) filling each microcell of the plurality of microcells with an electrophoretic medium comprising electrically charged pigment particles, a charge control agent, and a non-polar liquid; (f) sealing each microcell of the plurality of microcells with a sealing layer; and (g) attaching a first light transmissive electrode layer onto the sealing layer. If the light blocking composition comprises a solvent, the solvent is evaporated during the curing of the first dispersion composition. The curing of the light blocking composition may be achieved by UV irradiation, thermally, or by solvent evaporation.

Another method of manufacture of the device of FIG. 12 comprises the steps, (a) providing an assembly comprising in order a second light transmissive electrode layer, a second light transmissive electrode layer, a layer comprising a plurality of microcells being disposed on the second light transmissive electrode layer, each microcell of the plurality of microcells having a microcell opening, each microcell of the plurality of microcells comprising a microcell bottom layer, a protrusion structure, microcell walls, and a channel, the microcell bottom layer having a microcell bottom inside surface, the microcell bottom inside surface comprising an exposed microcell bottom inside surface and an unexposed microcell bottom inside surface, the protrusion structure having a protrusion base, a protrusion surface, a protrusion apex, and a protrusion height, the protrusion apex being a point or a set of points of the protrusion structure, the point or the set of points having shorter distance from the microcell opening than all other points of the protrusion structure, the protrusion height being the distance between the protrusion base and the protrusion apex, the protrusion surface being the surface of the protrusion structure not including the protrusion apex and the protrusion base, the microcell walls having a microcell inside wall surface and a microcell wall upper surface, the channel having a channel height, the channel height being 50% of the protrusion height, the unexposed microcell bottom inside surface being in contact with the protrusion base, the channel being a volume between the exposed microcell bottom inside surface, the protrusion surface, and the microcell inside wall surface; (b) dispensing a light blocking composition onto the exposed microcell bottom inside surface of each microcell, the light blocking composition comprising (i) light absorbing pigment particles, (ii) a polymer, oligomer, or monomer, and (iii) optionally, a solvent; (c) curing the light blocking composition to form a light blocking layer on the exposed microcell bottom inside surface; (d) filling each microcell of the plurality of microcells with an electrophoretic medium comprising electrically charged pigment particles, a charge control agent, and a non-polar liquid; (e) sealing each microcell of the plurality of microcells with a sealing layer; and (f) attaching a first light transmissive electrode layer onto the sealing layer. If the light blocking composition comprises a solvent, the solvent is evaporated during the curing of the second dispersion composition. The curing of the light blocking composition may be achieved by UV irradiation, thermally, or by solvent evaporation.

Examples 5 and 6 describe experiments towards the formation of a blocking layers using blocking compositions. In Example 5, the blocking composition comprises black electrically charged pigment particles, whereas in Example 6, the blocking composition comprises white electrically charged pigment particles.

Figure 13:
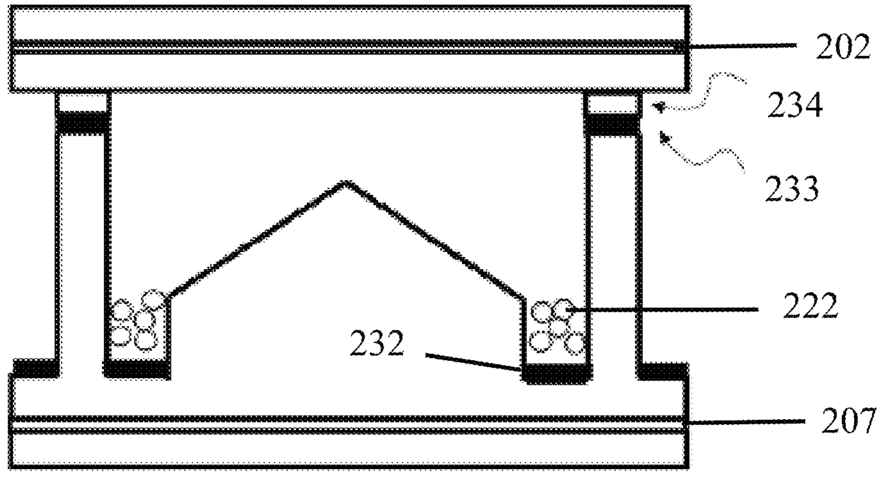
FIG. 13 illustrates a portion of a variable light transmission device comprising a light blocking layer on the microcell wall upper surface.

A variable light transmission device with improved performance of the closed optical state can also be achieved by using the device illustrated in FIG. 13. The variable light transmission device illustrated in FIG. 13 comprises a first light transmissive electrode layer (202); a second light transmissive electrode layer (207); and a microcell layer (203). The microcell layer is disposed between the first light transmissive electrode layer (202) and the second light transmissive electrode layer (207). The microcell layer comprises a plurality of microcells and a sealing layer. Each microcell of the plurality of microcells includes an electrophoretic medium, the electrophoretic medium comprising electrically charged pigment particles and a charge control agent in a non-polar liquid. Each microcell of the plurality of microcells has a microcell opening, the sealing layer spanning the microcell openings of the plurality of microcells. Each microcell of the plurality of microcells comprises a microcell bottom layer, a protrusion structure, microcell walls, and a channel. The microcell bottom layer has a microcell bottom inside surface, the microcell bottom inside surface comprising an exposed microcell bottom inside surface and an unexposed microcell bottom inside surface. The variable light transmission device of FIG. 13 further comprises a first light blocking layer 232, the first light blocking layer 232 being disposed on the exposed microcell bottom inside surface layer. The protrusion structure has a protrusion base, a protrusion surface, a protrusion apex, and a protrusion height. The protrusion apex is a point or a set of points of the protrusion structure having shorter distance from the microcell opening than all other points of the protrusion structure, the protrusion height being the distance between the protrusion base and the protrusion apex. The protrusion surface is the surface of the protrusion structure not including the protrusion apex that is in contact with the electrophoretic medium. The microcell walls have a microcell inside wall surface, a microcell wall upper surface, and a second light blocking layer 233. The microcell inside wall surface is the surface of the microcell walls of a microcell that is in contact with the electrophoretic medium. The second light blocking layer 233 is disposed between the microcell wall upper surface and the sealing layer. The channel has a channel height, the channel height being 50% of the protrusion height. The unexposed microcell bottom inside surface is in contact with the protrusion base. The channel is a volume between the first light blocking layer 232, the protrusion surface, and the microcell inside wall surface.

As described above, the first light blocking layer 232 mitigates the haze when the device is viewed from below. The second light blocking layer 233 contributes to an improved closed state by increasing the opacity of the device that may be caused by a partially light transmissive wall material. The second light blocking layer 233 may be black, white, or any other color. The second light blocking layer 233 may electrically conductive, which may facilitate the switching of the device. The second light blocking layer (233) can be formed by coating a pigment dispersion on the microcell wall upper surface and curing the coating via UV irradiation, thermally, or by solvent evaporation. The pigment dispersion may comprise pigment particles, a polymer, oligomer or monomer, and, optionally, a solvent. The variable light transmission device of FIG. 13 may further comprise an auxiliary layer 234, which is disposed between the sealing layer and the second light blocking layer 233. The auxiliary layer 234 may comprise an adhesive material. The auxiliary layer 234 may comprise a light reflecting pigment to further improve the opacity of the closed optical state. The auxiliary layer 234 may also comprise an encapsulated electrophoretic layer comprising an electrophoretic medium including electrically charged pigment particles. Application of an electric field across the encapsulated electrophoretic layer of the auxiliary layer 234 may switch the color (or the image) of the auxiliary layer 234, which can also affect the appearance of the variable light transmission device of FIG. 13.

Charge control agents are typically oligomeric or polymer materials that are soluble in the non-polar liquid of the electrophoretic medium. Charge control agents are surfactant-type molecules having one or more polar functional group (head) and a non-polar part (tail). The electrophoretic medium may comprise a charge control agent in a concentration of from 0.1 weight percent to 10 weight percent by weight of the electrophoretic medium. The electrophoretic medium may comprise a charge control agent in a concentration of from 0.5 weight percent to 9 weight percent, from 0.7 weight percent to 8 weight percent, from 1 weight percent to 7 weight percent, or from 1 weight percent to 6 weight percent by weight of the electrophoretic medium.

The non-polar liquid of the electrophoretic medium may comprise an aliphatic hydrocarbon, a cycloaliphatic hydrocarbon, an aromatic hydrocarbon, a halogenated aliphatic hydrocarbon, a polydimethylsiloxane, or mixture thereof.

The electrophoretic medium may also comprise a flocculating agent, also called depletor. The depletor induces an osmotic pressure difference between pigment-pigment particle and pigment particle depletor molecules. As a result, bistability of the optical states (open and closed) of the device is enhanced. Depletors are typically polymeric material such as polyisobutylene and polydimethylsiloxane.

EXAMPLES

Example 1

Figure 14:
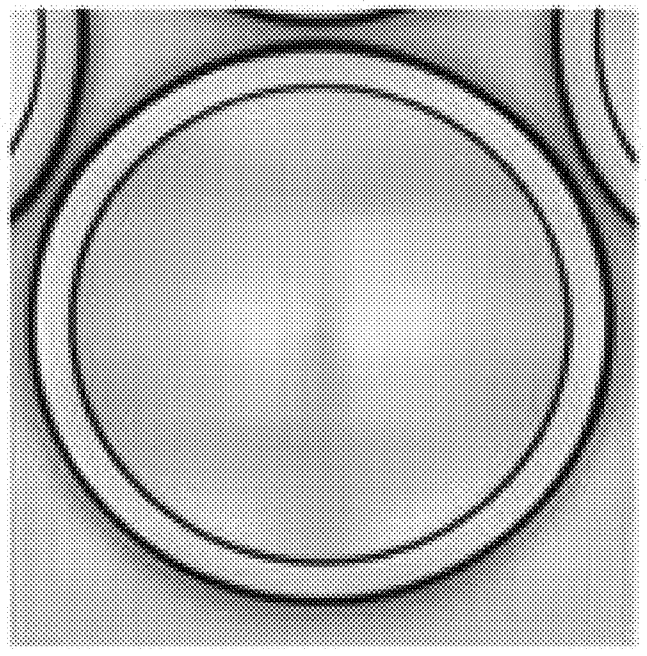
FIG. 14 shows a plan view of a microcell of the variable transmission device that was used in the examples.
Figure 15:
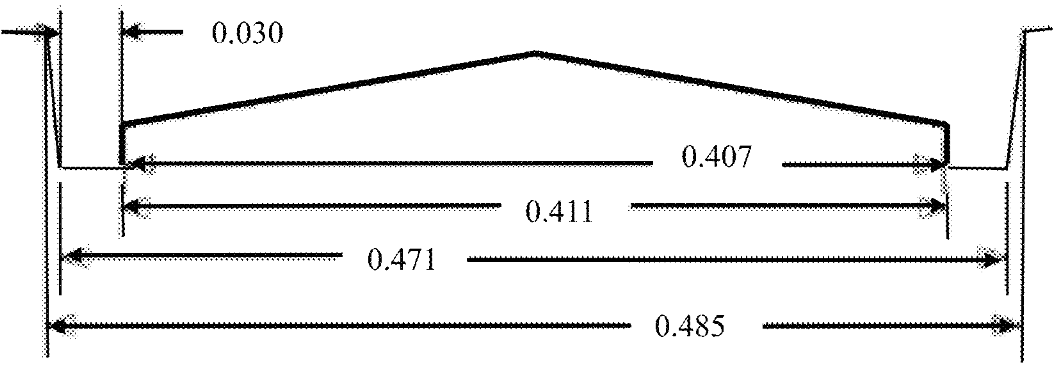
FIG. 15 shows a cross sectional view of a microcell of the variable transmission device that was used in the examples.

A device was prepared by laminating together a sheet of polyethylene terephthalate (PET) coated with an Indium Tin Oxide (ITO) transparent conductor to an embossed microcell array on a second sheet of PET/ITO containing and electrophoretic medium. The structure of the device corresponded to the illustration in FIG. 2A to 2D, except that the sealing layer 212 was not incorporated. The structure of the embossed microcell array is illustrated in FIG. 14, which is a plan view of a microcell of the device. FIG. 15 shows the corresponding cross-sectional view of one microcell of the device. Table 1 shows the dimensions of the microcell.

TABLE 1

| Device Structure | |
|---|---|
| Element | Distance in micrometers |
| Cavity Pitch: Center-to-Center of microcells | 500 |
| Height of cylinder (base) under cone protrusion | 15.2 |
| Maximum height of particle fill level (above base) | 15.2 |
| Minimum wall width at first substrate | 15 |
| Draft angle for walls and cone base | 8 |
| Wall height | 50 |
| Wall recess/groove width at first substrate | 10 |
| Wall recess/groove draft angle | 26.6 |
| Wall recess/groove depth | 5 |
| Clearance between protrusion apex and top of wall | 9 |
| Cone slope in degrees | 7.3 |

Figure 16:
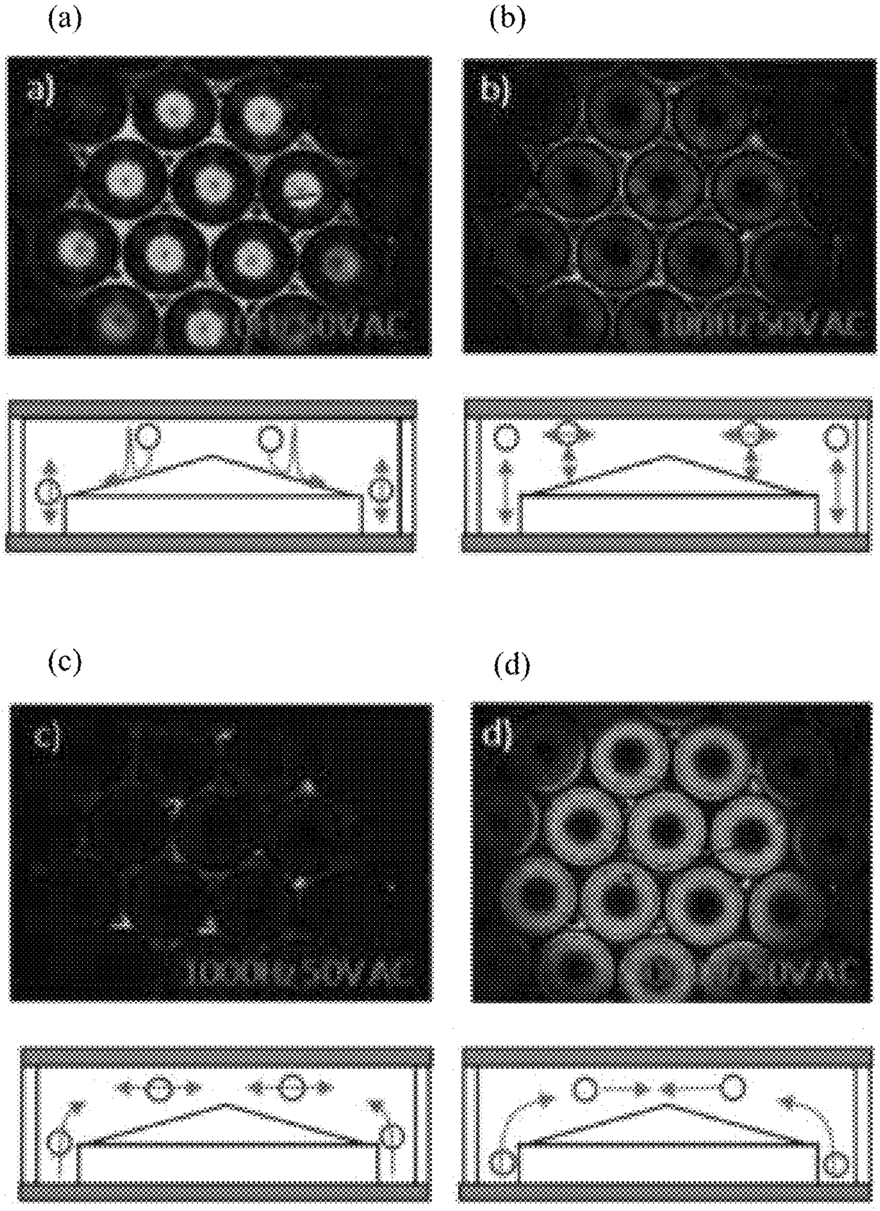
FIG. 16 provides micrographs of open and closed optical states of the variable light transmission device of Example 1, the optical states resulting from various waveforms.

The electrophoretic medium comprised a white pigment, hydrocarbon solvent, a charge control agent (CCA), and a depletor. In the example, the electrophoretic medium sample was prepared by mixing 10 wt % of white pigment and 5 wt % of a charge control agent (Cationic Charge Control Agent from Example 1—CCA111 of US2020/0355978) in Isopar E solvent. The device was switched with a 50V square wave AC waveform with 50% duty cycle. Three different pigment motion styles were observed by increasing AC frequencies from 0 Hz to 5000 Hz as shown in FIG. 16. The white pigment particles were prepared with a titanium dioxide pigment core and a polymer shell, as described in Example 1 of U.S. Pat. No. 8,582,196.

At the low frequency of 10 Hz and after multiple switches, the white pigment moved towards the edge (near the perimeter) of the microcell (FIG. 16*a*), presumably by slight nudges down the slope of the cone. Once located in the channel, the pigment switched up and down in a vertical direction. At this low frequency of 10 Hz, the motion was dominated by normal electrophoresis. By increasing the frequency to 100 Hz, the pigment tended to spread laterally into the region above the cone in the embossed microcell structure (FIG. 16*b*). At frequency of 1000 Hz, the white pigments completely spread into the circles of the embossed microcell structure, as shown in FIG. 16*c*. In the frequency of 1000 Hz, it is thought that the pigment behavior was dominated by induced-charge lateral motion, possibly the result of ICEO. At frequency of 5000 Hz, the white pigment particles tended to center of the near cone region of embossed microcell structure, as shown in FIG. 16(*d*).

Example 2

In Example 2, the effect of the concentration of the charge control agent (CCA) on the motion of white pigments in an embossed microcell device was studied.

As described previously, it is expected that increasing the concentration of the charge control agent of the electrophoretic medium would decrease the Debye length associated with an electrically charged pigment particle surface, and therefore, increase the frequency required for a particular ICEO flow. To test this hypothesis, three variable light transmission devices were prepared having similar electrophoretic media, but using different charge control agent concentrations. The charge control agent used in this example is a cationic polymer disclosed in Example 1-CCA111 of US2020/0355978. Three different electrophoretic media were prepared having charge control agent concentrations of 0.1 wt %, 1 wt %, and 5 wt % by weight of the electrophoretic medium. Each electrophoretic medium also comprised 10 wt % white pigment and Isopar E solvent. The white pigment particles were prepared with a titanium dioxide pigment core, which comprises a polymer coating, as described in Example 1 of U.S. Pat. No. 8,582,196.

Figure 17:
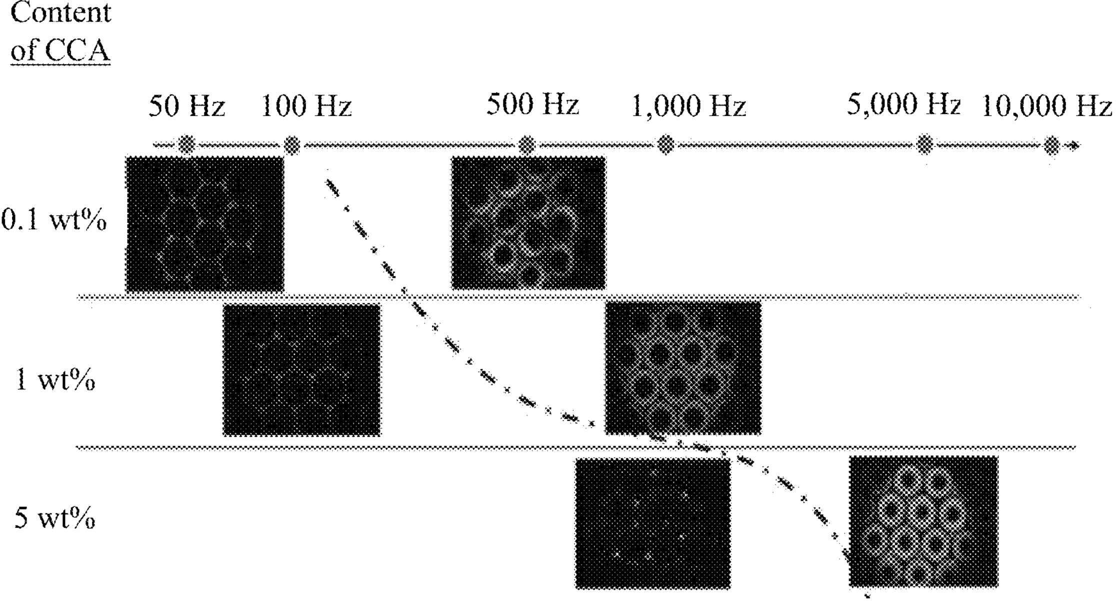
FIG. 17 provides micrographs of open and closed optical states of the variable light transmission devices of Example 2, the electrophoretic media of the devices comprising different concentrations of charge control agent.

The switching performance of the three samples were evaluated in the embossed microcell device (represented by FIGS. 14 and 15). The waveform was square wave +/−50V AC with 50% duty cycle. As shown in FIG. 17, increasing the concentration of charge control agent, increased the frequency required to reach the closed optical state. That is, a frequency of 50 Hz was required to achieve the closed optical state for the electrophoretic medium containing 0.1 wt % CCA, a frequency of 100 Hz was required to achieve the closed optical state for the electrophoretic medium containing 1 wt % CCA, and a frequency of 1000 Hz was required to achieve the closed optical state for the electrophoretic medium containing 5 wt % CCA. The ratio of frequency over the CCA concentration for the three experiments was 500 Hz, 1000 Hz, and 1000 Hz respectively.

The device having electrophoretic medium comprising 1 wt % CCA could be switched from the open optical state to the closed optical state using (a) a simple square wave AC of +/−100V at 0.5 Hz, or (b) a +/−50V square wave AC with 50 Hz frequency with superimposed DC voltage of −50V. The open optical state was reached by a +/−50V square wave AC with 5% duty cycle, whereas the closed optical state required +/−50V square wave AC with 95% duty cycle. The switching time in each case was approximately 1 second.

Example 3

The effect of the charge of the white pigment on switching performance of a variable light transmission device was studied.

A variable light transmission device was prepared having an electrophoretic medium comprising 10 wt % positively charged white pigment particles in Isopar E. The white pigment was functionalized with 1.6% wt of silane Z6030 and grafted with polylauryl methacrylate (PLMA). The zeta potential of the treated pigment was +35 mV titrated with the CCA (cationic polymer disclosed in Example 1-CCA111 of US2020/0355978CCA111). The electrophoretic medium also comprised 1 wt % of CCA (cationic polymer disclosed in Example 1-CCA111 of US2020/035597811). The waveform that was used to switch the device from the open optical state to the closed optical state was DC superimposing AC, i.e., square wave waveform, +/−50V AC with 500 Hz frequency. The waveform to switch the device from the closed optical state to the open optical state was +/−50V AC with offset of +50V DC. The behavior of the device of Example 3 was thus very similar to that of the device with electrophoretic medium comprising 1 wt % of CCA of Example 2, except that the DC offset required to achieve the open optical state was of opposite polarity.

Example 4

In this example, the solvent of the electrophoretic medium matched the polymer that formed the embossed microcells.

"Haze" refers to the percentage of diffuse transmitted light compared to the total transmitted light. Diffuse transmitted light is light that is scattered as it is transmitted. In order to make a variable light transmission device with low haze, it was necessary to match the refractive index of the solvent of the electrophoretic medium liquid and the polymeric material that was used to make the embossed microcells, as described in U.S. Pat. No. 7,327,511.

Typically, solvents used in electrophoretic media have low dielectric constant (preferably less than 10 and desirably less than 3), low viscosity, low vapor pressure, and relatively high refractive index. Examples of solvents include, but are not limited to, aliphatic hydrocarbons such as heptane, octane, and petroleum distillates such as Isopar® (Exxon Mobil) or Isane® (Total), terpenes, such as limonene, e.g., 1-limonene, and aromatic hydrocarbons, such as toluene. A particularly preferred solvent is limonene, since it combines a low dielectric constant (2.3) with a relatively high refractive index (1.47). The refractive index of the electrophoretic medium may be modified with the addition of index matching agents. For example, the aforementioned U.S. Pat. No. 7,679,814 describes an electrophoretic medium suitable for use in a variable light transmission device in which the non-polar liquid of the electrophoretic medium comprises a mixture of a partially hydrogenated aromatic hydrocarbon and a terpene, a preferred mixture being d-limonene and a partially hydrogenated terphenyl, available commercially as Cargille® 5040 from Cargille-Sacher Laboratories, 55 Commerce Rd, Cedar Grove N.J. 07009.

To reduce haze, it is preferred that the refractive index of the encapsulated electrophoretic medium closely matches that of the encapsulating material. In most instances, it is beneficial to use an electrophoretic medium having a refractive index between 1.51 and 1.57 at 550 nm, preferably about 1.54 at 550 nm.

Example 4A

A variable light transmission device comprising microcells was prepared having an electrophoretic medium comprising 5 wt % of white pigment, and 1 wt % CCA (cationic polymer disclosed in Example 1-CCA111 of US2020/035597811) in Cargille® 5040 and Isopar E solvents. The waveform used was square wave AC with 10 Hz frequency and amplitude of +/−50V. To reach the closed optical state, a 5% duty cycle was used. To reach the open optical state, a 95% duty cycle employed firstly, followed by changing the duty cycle to 50%.

Example 4B

Another variable light transmission device comprising microcells was prepared using an electrophoretic medium having similar composition as Example 4A, further comprising polyisobutylene (PIB) as depletor. The depletor is used to improve the bistability of the device, that is, to ensure that the open optical state and the closed optical state are maintained when no electric field is applied on the device. The electrophoretic medium comprises 10 wt % of white pigment, 1 wt % CCA (cationic polymer disclosed in Example 1-CCA111 of US2020/035597811), 0.5 wt % of polyisobutylene in Cargille® 5040, and Isopar E. solvents. The waveform used was a +/−50V square wave AC having a 10 Hz frequency. To reach the closed optical state, a 5% duty cycle alternating with a 50% duty cycle was used. To reach the open optical state, a 95% duty cycle was employed, followed by 50% duty cycle. The time required for complete switching was approximately 20 seconds. This time is considerably longer than the time required to switch the non-index-matched solvent that contains no depletor (Example 4A).

Example 5. Light Blocking Layer Comprising Black Particles

A variable transmission device was prepared by laminating together a sheet of PET coated with an ITO transparent conductor to an embossed microcell array on a second sheet of PET/ITO, the embossed microcell array containing an electrophoretic medium. The structure of the embossed microcell array is illustrated in FIGS. 2A to 2D, although the microcell of this example does not comprise a sealing layer.

Figure 18:
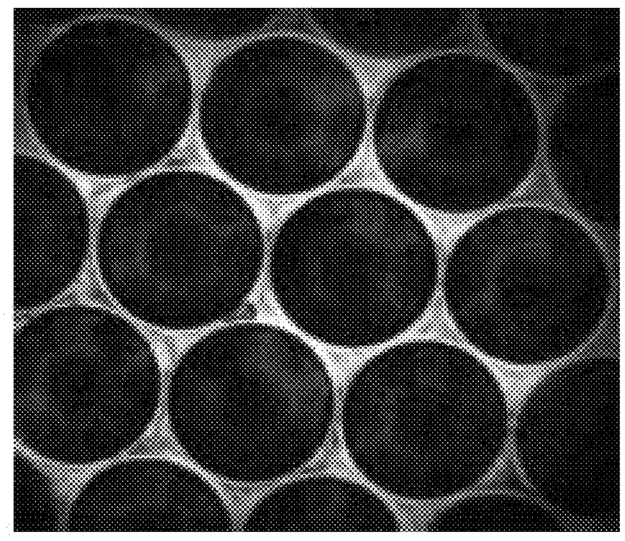
FIG. 18 is a micrograph of a microcell array of the variable light transmission device of Example 5; the light blocking composition comprises black pigment particles, which are distributed in the entire microcell (closed optical state).
Figure 19:
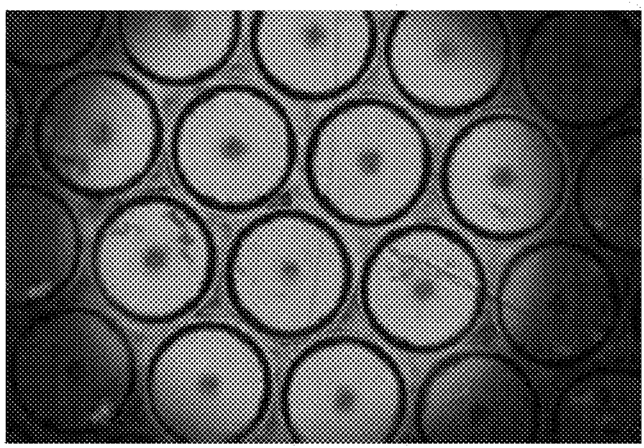
FIG. 19 is a micrograph of a microcell array of the variable light transmission device from Example 5, wherein the black pigment particles of the light blocking composition are driven into the channel of the microcells (closed optical state).

The light blocking composition that was used for the light blocking layer comprised a black pigment, a solvent, a charge control agent, and depletor. In this example, the light blocking composition was prepared by mixing 10 wt % black pigment, 1 wt % CCA (Cationic Charge Control Agent from Example 1—CCA111 of US2020/0355978111), and 0.5 wt % polyisobutylene in a solvent mixture of a partially hydrogenated terphenyl, available commercially as Cargille® 5040 from Cargille-Sacher Laboratories, 55 Commerce Rd, Cedar Grove N.J. 07009, Limonene, Isopar M and Isopar E. The black pigment particle has a core comprising black iron oxide (Pigment Black 11) and a polymeric shell. As shown in the FIG. 18, the black pigment particles were dispersed in the entire electrophoretic medium when the device was made. An waveform of 0.5 Hz, 50V square waveform with +50V offset (i.e., switching between +100V and 0V) and 50% duty cycle was applied to the first light transmissive electrode layer, while the second light transmissive electrode layer was kept at 0 V. The electric field between the two electrodes induced electrophoresis and drove the positive black pigment to the unexposed microcell bottom surface (inside the channel), as demonstrated in FIG. 19. The black pigment remained on the unexposed microcell bottom surface after the voltage was released. The PET/ITO first electrode was then peeled from the device to allow the evaporation of the film.

Example 6

Figure 20:
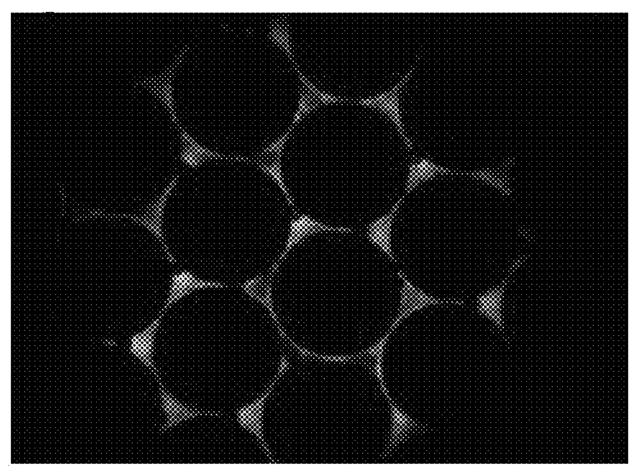
FIG. 20 is a micrograph of a close optical state of a microcell array of the variable light transmission device of Example 6; the white electrically charged pigment particles of the light blocking composition are distributed in the entire microcell (closed optical state).
Figure 21:
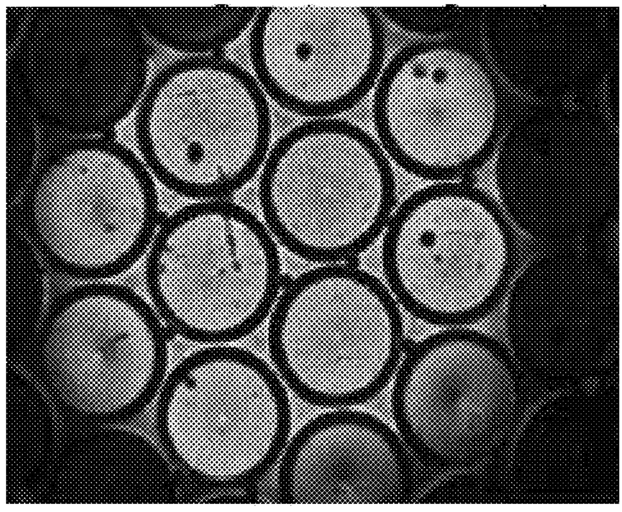
FIG. 21 is a micrograph of an open optical state of a microcell array of the variable light transmission device of Example 6; the white electrically charged pigment particles of the light blocking composition are driven in the channel (open optical state).

A variable light transmission device was prepared as the variable light transmission device of Example 5, except that the light blocking composition was formulated by mixing 10 wt % of white pigment and 5 wt % CCA (Cationic Charge Control Agent from Example 1—CCA111 of US2020/0355978111) in Isopar E solvent. The device was readily switched under 50 Hz/50V square wave between the closed optical state (0 V offset, FIG. 20) and the open optical state (−50V offset, FIG. 21).

Example 7: Switching Black and White Pigments of Opposite Charge into the Channel in an Embossed Microcell A variable transmission device was prepared by laminating together of a sheet of PET coated and an ITO transparent conductor to an embossed microcell array, containing and electrophoretic medium, on a second sheet of PET/ITO. The structure of the microcell corresponded to the illustration in FIG. 2A to 2D, except that the device does not comprise a sealing layer. The structure of the embossed microcell array is illustrated in FIGS. 14 and 15.

First, an electrophoretic composition comprising a black pigment was prepared and switched into the open optical state (black pigment included in the channel). The first light transmissive electrode layer was then removed and the solvent was evaporated. After the evaporation of the solvent, an electrophoretic medium containing a white pigment, solvent, and charge control agent (CCA) was prepared. In this example, the electrophoretic medium was prepared by mixing 10 wt % white pigment and 1 wt % CCA111 in a solvent mixture of a partially hydrogenated terphenyl, available commercially as Cargille® 5040 from Cargille-Sacher Laboratories, 55 Commerce Rd, Cedar Grove N.J. 07009, Limonene, Isopar M and Isopar E. The white pigment particles were prepared with a titanium dioxide pigment core, which comprises a polymer coating, as described in Example 1 of U.S. Pat. No. 8,582,196.

The electrophoretic medium was assembled into a microcell device in which the black pigment had been switched into the channel and the solvent evaporated. Thus, the device contained both white and black pigment particles of opposite charges. Both pigments were able to be switched electrophoretically. To switch both pigment into the channel, first the black pigment was switched into the channel using a positive DC offset on an AC voltage with relatively low frequency, then the white pigment was switched into the channel with a negative DC offset on an AC voltage with a relatively high frequency.

In a first step, a waveform of 10 Hz, 50V square waveform 50% duty cycle and +2V offset was applied to the first light transmissive electrode layer 202 while the second light transmissive electrode layer was kept at 0V. The electric field between the electrodes induced electrophoresis with superimposed induced-charge electro-osmosis and drove the positive black pigment into the channel. In a second step, a waveform of 500 Hz/50V square waveform 50% duty cycle and alternating +2V and −2V offset was applied to the first electrode, while the second electrode was kept at 0V. At the higher frequency (500 Hz versus 10 Hz in the first step) there was less lateral motion of the black pigment than the white pigment. That is, the white pigment was driven into the channel during the phases of the waveform with a negative DC offset. As shown in FIG. 22, the result was that both the white and the black pigments were switched into the channels of the microcells.

Parts of the structures in the drawings: 200 Variable transmission device; 201 First transparent substrate; 202 First light-transmissive electrode layer; 203 Microcell layer; 204 Plurality or microcells; 205 Microcell opening; 206 Sealing layer; 207 Second light-transmissive electrode layer; 208 Second transparent substrate; 209 Electrophoretic medium; 210 Microcell bottom layer; 211 Microcell bottom inside surface; 211*a* Exposed microcell bottom inside surface; 211*b* Unexposed microcell bottom inside surface; 212 Microcell walls; 213 Microcell inside wall surface; 214 Microcell wall upper surface; 125 Channel; 216 Channel height; 217 Protrusion structure; 218 Protrusion base; 219 Protrusion apex; 220 Protrusion height; 221 Protrusion surface; 222 Electrically charged pigment particles; 222*a* First type of electrically charged pigment particles; 222*b* Second type of electrically charged pigment particles; 223*a* First type of electrically charged pigment particles having opposite charge polarity from Second type of electrically charged pigment particles 223*b*; 223*b* Second type of electrically charged pigment particles having opposite charge polarity from first type of electrically charged pigment particles 223*a*; 232 First light blocking layer, 233 Second light blocking layer; 234 Auxiliary layer.

The invention claimed is:

1. A variable light transmission device comprising:

a first light transmissive electrode layer (202);

a second light transmissive electrode layer (207); and a microcell layer (203), the microcell layer (203) being disposed between the first light transmissive electrode layer (202) and the second light transmissive electrode layer (207), the microcell layer (203) comprising a plurality of microcells (204) and a sealing layer (206), each microcell of the plurality of microcells (204) including an electrophoretic medium (209), the electrophoretic medium (209) comprising electrically charged pigment particles and a charge control agent, in a non-polar liquid, each microcell of the plurality of microcells (204) having a microcell opening (205), the sealing layer (206) spanning the microcell openings (205) of the plurality of microcells (204), each microcell of the plurality of microcells (204) comprising a microcell bottom layer (210), a protrusion structure (217), microcell walls (212), and a channel (215), the microcell bottom layer (210) having a microcell bottom inside surface (211), the microcell bottom inside surface (211) comprising an exposed microcell bottom inside surface (211*a*) and an unexposed microcell bottom inside surface (211*b*), each microcell of the plurality of microcells (204) comprising a first light blocking layer (232), the first light blocking layer (232) being in contact with the exposed microcell bottom inside surface (211*a*) and with the electrophoretic medium (209), the protrusion structure (217) having a protrusion base (218), a protrusion surface (221), a protrusion apex (219), and a protrusion height (220), the protrusion apex (219) having shorter distance from the microcell opening (205) than all other points of the protrusion structure (217), the protrusion height (220) being the distance between the protrusion base (218) and the protrusion apex (219), the protrusion surface (221) being the surface of the protrusion structure (217) not including the protrusion apex that is in contact with the electrophoretic medium (209), the microcell walls (212) having a microcell inside wall surface (213) and a microcell wall upper surface (214), the microcell inside wall surface (213) being the surface of the microcell walls (212) of a microcell that is in contact with the electrophoretic medium (209), the microcell wall upper surface (214) being the surface of the microcell walls (212) of a microcell that is in contact with the sealing layer (206), the channel (215) having a channel height (216), the channel height (216) being 50% of the protrusion height (220), the unexposed microcell bottom inside surface (211*b*) being in contact with the protrusion base (218), the channel (215) being a volume between the first light blocking layer (232), the protrusion surface (221), and the microcell inside wall surface (213).

2. The variable light transmission device of claim 1, wherein the protrusion structure is a geometric solid selected from the group consisting of (a) a cone, (b) a cone on a cylinder, the cylinder having a base, the cylinder's base being the protrusion base of the protrusion structure, (c) a tetrahedron, (d) a tetrahedron on a triangular prism, the triangle prism having a triangle base, the triangle base being the protrusion base of the protrusion structure, (e) a triangular prism, the triangular prism having a square base, the square base being the protrusion base of the protrusion structure, (f) a square pyramid having a square base, the square base being the protrusion base of the protrusion structure, (h) a square pyramid on a cube, the cube having a base, the cube base being the protrusion base of the protrusion structure, (i) a square pyramid on a right parallelepiped, the right parallelepiped having a right parallelogram base, the right parallelogram being the protrusion base of the protrusion structure, (j) a pentagonal pyramid, the pentagonal pyramid having a pentagon base, the pentagon base being the protrusion base of the protrusion structure, (k) a pentagonal pyramid on a pentagonal prism, the pentagonal prism having a pentagon base, the pentagon base being the protrusion base of the protrusion structure, (l) an a hexagonal pyramid, the hexagonal pyramid having an hexagon base, the pentagon base being the protrusion base of the protrusion structure, (m) an hexagonal pyramid on an hexagonal prism, the hexagonal prism having an hexagon base, the hexagon base being the protrusion base of the protrusion structure.

3. The variable light transmission device of claim 1, wherein the first light blocking layer comprises light absorbing pigment particles and a polymer.

4. The variable light transmission device of claim 3, wherein the light absorbing pigment particles are electrically charged.

5. The variable light transmission device of claim 4, wherein the light absorbing pigment particles are black.

6. The variable light transmission device of claim 1, wherein the first light blocking layer is formed by curing of a first light blocking composition, the first light blocking composition comprising a light absorbing pigment, a polymer, oligomer, or monomer, and a solvent.

7. The variable light transmission device of claim 6, wherein the curing of the first light blocking composition is achieved thermally, by UV irradiation, by solvent evaporation, or by a combination thereof.

8. The variable light transmission device of claim 1 further comprising a second light blocking layer, the second light blocking layer being disposed between the microcell wall upper surface and the sealing layer.

9. The variable light transmission device of claim 8, wherein the second light blocking layer comprises light absorbing pigment particles and a polymer.

10. The variable light transmission device of claim 8, wherein the second light blocking layer is conductive.

11. The variable light transmission device of claim 8, wherein the second light blocking layer is formed by coating the microcell wall upper surface with a dispersion composition and curing the coated dispersion composition thermally, by UV irradiation, by solvent evaporation, or by a combination thereof, the dispersion composition comprising a light absorbing pigment, a polymer, oligomer, or monomer, and optionally, a solvent.

12. The variable light transmission device of claim 8 further comprising an auxiliary layer (234), the auxiliary layer being disposed between the second light blocking layer (233) and the sealing layer (206).

13. The variable light transmission device of claim 12, wherein the auxiliary layer is an adhesive layer.

14. The variable light transmission device of claim 12, wherein the auxiliary layer comprises light reflecting pigment particles.

15. The variable light transmission device of claim 12, the auxiliary layer comprising an encapsulated electrophoretic layer, the encapsulated electrophoretic layer comprising an electrophoretic medium including electrically charged pigment particles, wherein, upon application of an electric field across the encapsulated electrophoretic layer of the auxiliary layer, a color or image switching of the auxiliary layer is achieved.

16. The variable light transmission device of claim 1, wherein application of a first electric field between the first light transmissive electrode layer (202) and the second light transmissive electrode layer (207) via a first waveform causes movement of the electrically charged pigment particles to the channel (215), resulting in the switching of the variable light transmission device (200) to an open optical state, the electrically charged pigment particles in the open optical state being located inside the channel (215), and wherein application of a second electric field between the first light transmissive electrode layer (202) and the second light transmissive electrode layer (207) via a second waveform causes a movement of the electrically charged pigment particles (222) towards the first light transmissive electrode layer (202) with a velocity, the velocity having a lateral component, leading to a closed optical state, the second waveform comprising at least one positive voltage and at least one negative voltage, the second waveform having a net positive or net negative impulse, wherein the closed optical state has lower percent light transmission than the open optical state.

17. The variable light transmission device of claim 16, wherein the second waveform comprises an AC waveform, the AC having a frequency, the AC waveform having a duty cycle of from 5% to 45%.

18. The variable light transmission device of claim 16, wherein the second waveform comprises a waveform that is formed by a superposition of a DC voltage component and an AC waveform.

19. A method of manufacture of a variable light transmission device comprising the steps:

providing an assembly comprising a third electrode layer, a second light transmissive electrode layer, a layer comprising a plurality of microcells, the layer comprising a plurality of microcells being disposed between the third electrode layer and the second light transmissive electrode layer, each microcell of the plurality of microcells including a light blocking composition comprising (i) light absorbing electrically charged pigment particles, (ii) a polymer, oligomer, or monomer and, (iii) a solvent, each microcell of the plurality of microcells having a microcell opening, the third electrode layer spanning the microcell openings of the plurality of microcells, each microcell of the plurality of microcells comprising a microcell bottom layer, a protrusion structure, microcell walls, and a channel, the microcell bottom layer having a microcell bottom inside surface, the microcell bottom inside surface comprising an exposed microcell bottom inside surface and an unexposed microcell bottom inside surface;

applying an electric field between the third electrode layer and the second light transmissive electrode layer via a waveform that causes movement of the light absorbing electrically charged pigment particles of the light blocking composition towards the channel and resulting in a state in which state the light absorbing electrically charged pigment particles are located inside the channel;

curing the light blocking composition to form a light blocking layer on the exposed microcell bottom inside surface;

removing the third electrode layer;

filling each microcell of the plurality of microcells with an electrophoretic medium comprising electrically charged pigment particles, a charge control agent, and a non-polar liquid;

sealing each microcell of the plurality of microcells with a sealing layer; and attaching a first light transmissive electrode layer onto the sealing layer.

20. A method of manufacture of a variable light transmission device comprising the steps:

providing an assembly comprising in order a second light transmissive electrode layer, a second light transmissive electrode layer, a layer comprising a plurality of microcells being disposed on the second light transmissive electrode layer, each microcell of the plurality of microcells having a microcell opening, each microcell of the plurality of microcells comprising a microcell bottom layer, a protrusion structure, microcell walls, and a channel, the microcell bottom layer having a microcell bottom inside surface, the microcell bottom inside surface comprising an exposed microcell bottom inside surface and an unexposed microcell bottom inside surface, the protrusion structure having a protrusion base, a protrusion surface, a protrusion apex, and a protrusion height, the protrusion apex having shorter distance from the microcell opening than all other points of the protrusion structure, the protrusion height being the distance between the protrusion base and the protrusion apex, the protrusion surface being the surface of the protrusion structure not including the protrusion apex and the protrusion base, the microcell walls having a microcell inside wall surface and a microcell wall upper surface, the channel having a channel height, the channel height being 50% of the protrusion height, the unexposed microcell bottom inside surface being in contact with the protrusion base, the channel being a volume between the exposed microcell bottom inside surface, the protrusion surface, and the microcell inside wall surface;

dispensing a light blocking composition onto the exposed microcell bottom inside surface of each microcell, the light blocking composition comprising (i) light absorbing pigment particles, (ii) a polymer, oligomer, or monomer, and (iii) a solvent;

curing the light blocking composition to form a light blocking layer on the exposed microcell bottom inside surface;

filling each microcell of the plurality of microcells with an electrophoretic medium comprising electrically charged pigment particles, a charge control agent, and a non-polar liquid;

sealing each microcell of the plurality of microcells with a sealing layer; and attaching a first light transmissive electrode layer onto the sealing layer.

* * * * *